United States Patent [19]

Schlang

[11] Patent Number: 4,558,461
[45] Date of Patent: Dec. 10, 1985

[54] TEXT LINE BOUNDING SYSTEM

[75] Inventor: Arthur Schlang, Coram, N.Y.

[73] Assignee: Litton Systems, Inc., College Park, Md.

[21] Appl. No.: 505,545

[22] Filed: Jun. 17, 1983

[51] Int. Cl.[4] ............................................. G06K 9/36
[52] U.S. Cl. ............................................. 382/9; 382/46; 382/48
[58] Field of Search ................ 382/9, 48, 46, 61; 340/727

[56] References Cited

U.S. PATENT DOCUMENTS

| | | | |
|---|---|---|---|
| 3,553,437 | 1/1971 | Boothroyd | 382/46 |
| 3,847,346 | 11/1974 | Dolch | 382/46 |
| 4,292,621 | 9/1981 | Fuller | 382/46 |
| 4,338,588 | 7/1982 | Chevillat et al. | 382/46 |

OTHER PUBLICATIONS

Bishop et al., "Char. Rec. Approach Involving Histogram Classification", *IBM Tech. Disclosure Bulletin*, vol. 21, No. 9, Feb. 1979, pp. 3461–3467.

*Primary Examiner*—Leo H. Boudreau
*Attorney, Agent, or Firm*—Robert F. Rotella; Michael H. Wallach

[57] ABSTRACT

A text line bounding system for non-mechanically adjusting for skewed text in scanned text. The data from scanned page texts are divided into vertical swaths and all pixels at respective vertical levels within each swath are set black if any one pixel within the swath at the level is black. Intersections and terminations are found and the datum for each line is established after removing extraneous data. The skew angle of the text is then established, following which the text lines are statistically bounded. The actual text data is then rotated according to the orientation established for conventional processing.

12 Claims, 25 Drawing Figures

NOTES:
1. 20 PELS/SWATH (0.1")
2. 79 SWATHS
3. ACCEPTABLE SYMBOL HEIGHT FOR ILLUSTRATION > 9 PIXELS

TEXT LINE BOUNDING SYSTEM

BACKGROUND OF THE INVENTION

This invention relates, but is not limited, to optical character recognition systems such as optical character readers and, more particularly, to methods and apparatus for correcting for skew conditions in text lines being optically read.

A basic requirement for Optical Character Recognition (OCR) is to locate and bound each line of text on a document. For the usual OCR application, this is a constrained task in that apriori it is known that the page contains one font, all character spaces are defined, and all text line spaces are given. Furthermore, the document usually contains only textual material, or, if non-textual data exists, it is field-formatted to eliminate it from consideration in line finding. Text line tilt is carefully controlled, and many commercial OCR machines utilize the top line of the text on a page for a reference to physically deskew the page prior to line finding.

For many standard fonts, FIG. 1 is illustrative of the basic types of character elements. Generally, capital letters, such as the "A" and "B", are bounded by levels 2 and 4. Lower case such as the "a", is bounded by levels 3 and 4, and is shorter in stature than the capitals. Lower case such as the "b", is constrained by levels 1 and 4, and is taller than the capitals. Lower case such as the "g", is bounded by levels 3 and 5, and is about as tall as the capitals, but with a segment dropping below the capital bottoms. Punctuation marks such as the period, quotations, and commas are short in stature, and are attached to either levels 2 or 4. Arithmetic operators such as the plus sign or asterisk are also short, and congregate around level 3.

A typical situation of skewing is shown in FIG. 2. The document 10 contains lines of text generally indicated as 12. As document 10 moves through an optical character reader in the direction of arrow 14, the scanning optics continually scan across the document 10 in the direction of the arrow 16, which is normal to the document margin 18. If the text margin 20 is parallel to the document margin 18, such a scanning pattern causes each line of text to be scanned along its length as it passes under the optic scanning head. As shown in FIG. 2, however, in the skewed document 10, the text margin 20 is not parallel to the document margin 18 but, rather, is at an angle to it. Thus, the lines of text 12 are at the same angle to the optic scan direction of arrow 16. As a consequence, for example, instead of scanning the first text line 22 and then the second line 24, the right half of line 22 (as FIG. 2 is viewed) is encountered first, followed by the left half of line 22 and the right half of line 24, and finally the left half of line 24. If the data thus scanned are then searched on the normal basis, it yields a meaningless interpretation of the text 12. In a similar fashion, depending on interline spacing and document tilt, the left portion of text line 22 may be encountered on the early part of the scan while the right portion of that line 22 is encountered later in the scan.

In certain optical character recognition applications, it is essential that character line rotational effects be removed prior to processing to avoid the generation of meaningless date. Such rotations are usually caused by document feed skewing or typewriter induced skewed text in the actual source document such as that of FIG. 2.

One prior art method of circumventing the skew problem is to physically rotate the document or the scanning head in the machine. Such an approach is inconvenient at best, however. What would be preferable, and is therefore the object of the present invention, is a completely non-mechanical correction system and method which identifies and bounds lines of text and which:

1. Automatically accommodates to arbitrary fonts and sizes thereof.
2. Automatically accommodates to inter-mixed fonts.
3. Automatically accepts random inter-character and inter-text line spacings.
4. Automatically accommodates to a wide range of document skew angles.
5. Automatically accepts text lines of variable lengths and locations.
6. Automatically recognizes non-textual data and ignores it in text line finding and bounding.

SUMMARY

The foregoing objectives have been attained by the method and apparatus of the present invention wherein the actual text data is saved for later use and a copy is employed to determine the text orientation. The data is divided into uniform width vertical swaths and then the data is revised to make all pixels in the swaths at each vertical position black if that swath position contains any one black pixel. All intersection/terminal pairs in each swath are then located and saved along with their locations by vertical position. Simultaneously, superfluous intersections and terminations are discarded. Pairs which are spaced too close together or too far apart to represent meaningful data are then culled out from the data. The total number of retained pairs are saved by swath. The right most swath having the maximum number of pairs is then found and used as a base vector. The logic employed then searches to the left and the right for each pair in the base vector to establish a data array representative of the text line angulation. Lines having fewer than a minimum number of acceptable pairs are culled out as being too short or possibly of an extraneous nature such that the data retained has the highest probability of being members of lines of text. A linear regression is then used on the data array to determine the skew angle of the text. The data for each line of text is then boxed in to determine the left edge, right edge, top and bottom. The data thus ascertained is then used to shift the actual text data to compensate for skew before processing in the normal manner.

DESCRIPTION OF THE PREFERRED EMBODIMENT

The preceding objects are accomplished in the present invention by utilizing a statistical methodology without any mechanical page deskewing assist. At this time, it is felt that implementation is best accomplished employing dedicated hardware under microprocessor control as disclosed hereinafter. As the microprocessor art matures, implementation might be fully relegated to that technology employing the logic also shown in general terms.

With reference once again briefly to FIG. 1, the human eye has no trouble in identifying level 4 as the alignment reference for the line of printing. Before a machine can do likewise, however, it must discount hang-down characters, punctuation marks, etc. This is a form of pattern recognition, and is an essential part of the present invention.

Figure 1:
FIG. 1 is a drawing of text characters indicating the various levels of the characters in a typical text line.
Figure 2:
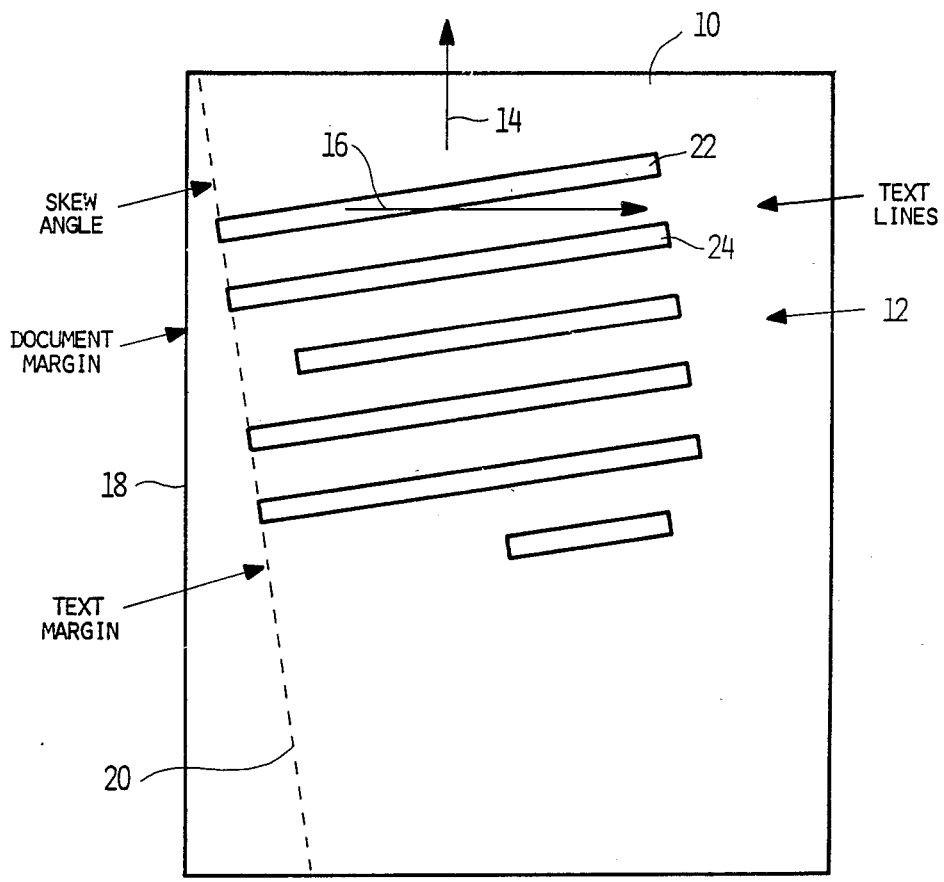
FIG. 2 is a simplified drawing showing skewed text lines on a document to be optically scanned.

The following definitions with respect to FIG. 1 are referred to in the subsequent discussion.

(a) Datum—Level 4 denotes the bottoms of non-hangdown alphabet and all numeric characters. For character recognition, the datum is employed in the present invention as a more preferable alignment reference than the top or bottom of a character as generally employed in the prior art.

(b) Line Top—In absolute terms, Level 1 represents the tip of the highest character in a line of text which also allows for vertically misaligned characters.

(c) Line Bottom—In absolute terms, Level 5 represents the lowest element in a line of text which allows for vertically mis-aligned characters. With no hang-down characters, levels 4 and 5 approximately merge.

(d) Left Boundary—The extreme left tip of the leftmost character in a line of text. The leftmost point of the letter "A" on Level 4, for example, is the Left Boundary.

(e) Right Boundary—The extreme right tip of the rightmost character in a line of text. That point is, for example, the right edge of the comma.

FIG. 1 portrays a non-rotated line of text, but the above definitions also apply to skewed text. The stated objectives are accomplished in the present invention by referencing levels 1 through 5 to a rotated coordinate system. This technique will become clearer in the following description where the algorithms incorporated into the method and apparatus of the present invention are described in broader detail.

THE SYSTEM IN GENERAL

Figure 3:
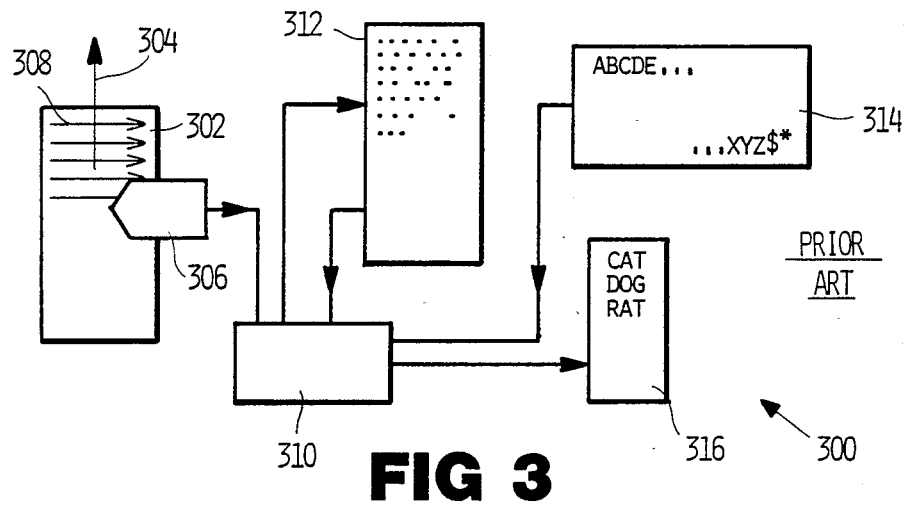
FIG. 3 is a simplified drawing of a prior art optical scanning system.

Referring first to FIG. 3, the general approach of an optical character recognition system according to the prior art is shown. The system, generally indicated as 300, employs a drive mechanism (not shown) to move a document 302 in the direction of arrow 304 past a rotating scan head 306, which scans across the document 302 in the direction of the arrows 308 as the document 302 moves beneath it. The scan head 306 is connected to a digital controller 310 which reads the stream of digital data from the scan head 306 and stores it in memory 312. The data from scan head 306 appears as a series of binary ones and zeros representing dark and light spots seen by the scan head 306 as it traverses across the document 302.

When the scan of the document 302 is complete, the digital controller 310 compares groups of dot data contained within the memory 312 to pre-established dot patterns representing known characters contained in memory 314. When a match is found, the corresponding character is used by the digital controller 310 in that position of the document to create the output at 316 in alpha-numeric characters. Output 316 can be another memory location or an output document.

As can be easily understood, if the document is skewed, the input from the scan head 306 nonetheless is nothing more than a series of binary ones and zeros representing the dot pattern being scanned. If the scan head 306 has not scanned along a line of parallel text, the patterns in the memory 312 will only match one of the pre-established patterns in memory 314 by happenstance.

Figure 4:
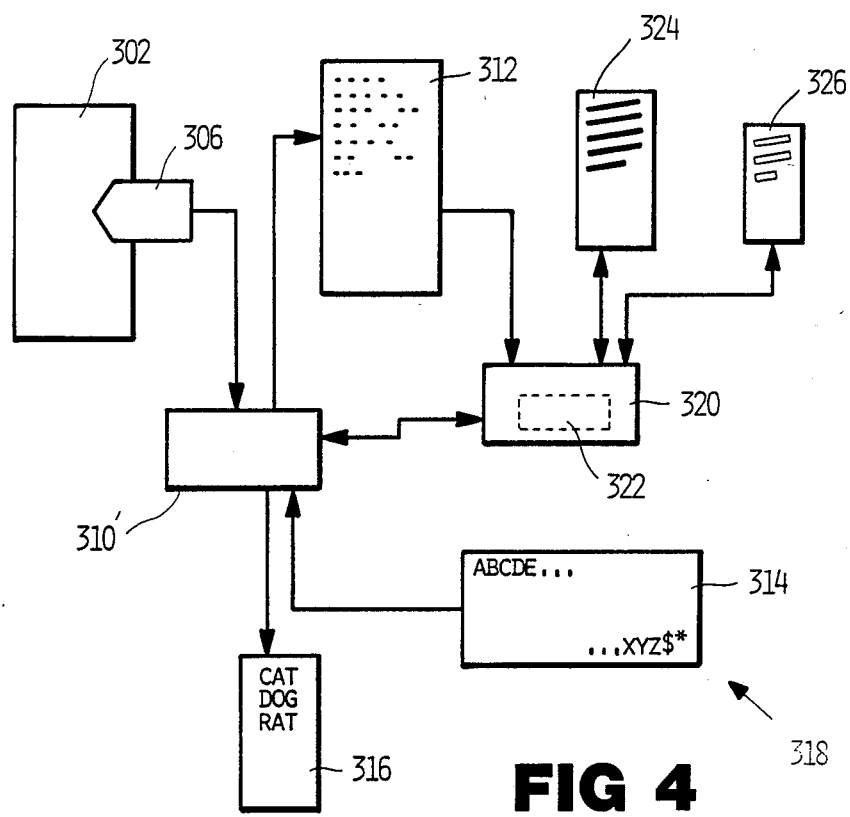
FIG. 4 is a simplified drawing showing an optical scanning system according to the present invention.

Turning now to FIG. 4, a system according to the present invention is shown. The system, generally indicated as 318, includes the scan head 306 for scanning the document 302 in a similar manner as described with respect to the system of FIG. 3. As with the previous system, a digital controller 310' takes the data stream from the scan head 306 and stores it into memory 312. According to the present invention, however, a second controller 320 containing logic 322 processes the data in memory 312 before it is compared to the patterns contained in memory 324 to create the output 326. The second controller 320 could be incorporated with the first controller 310' as a single processing unit if desired.

Logic 322 first takes the data of individual points contained in memory 312 and divides them into swaths. Each vertical position or row in each swath is then treated as entirely black if at least one dot position within that row of the swath is black. This revised data representation is stored in memory 324. That connected data by swath is then evaluated to determine the skew angle of the text. Once the skew angle is determined, logic 322 plots out the bounds of the four corners of each line of text and stores this information in memory 326. The contents of memory 326, therefore, is a map to memory 312 indicating where the data for each line of text lies. Comparison of the data can then commence in any of several manners according to the prior technique in general. For example, the data from memory 312 can be picked up by text lines along the boundary lines established in memory 326. As an alternative, the data contained in memory 312 can be physically "rotated" into its proper position as if picked up in a true horizontal scan and then be processed in the conventional manner.

Figure 19:
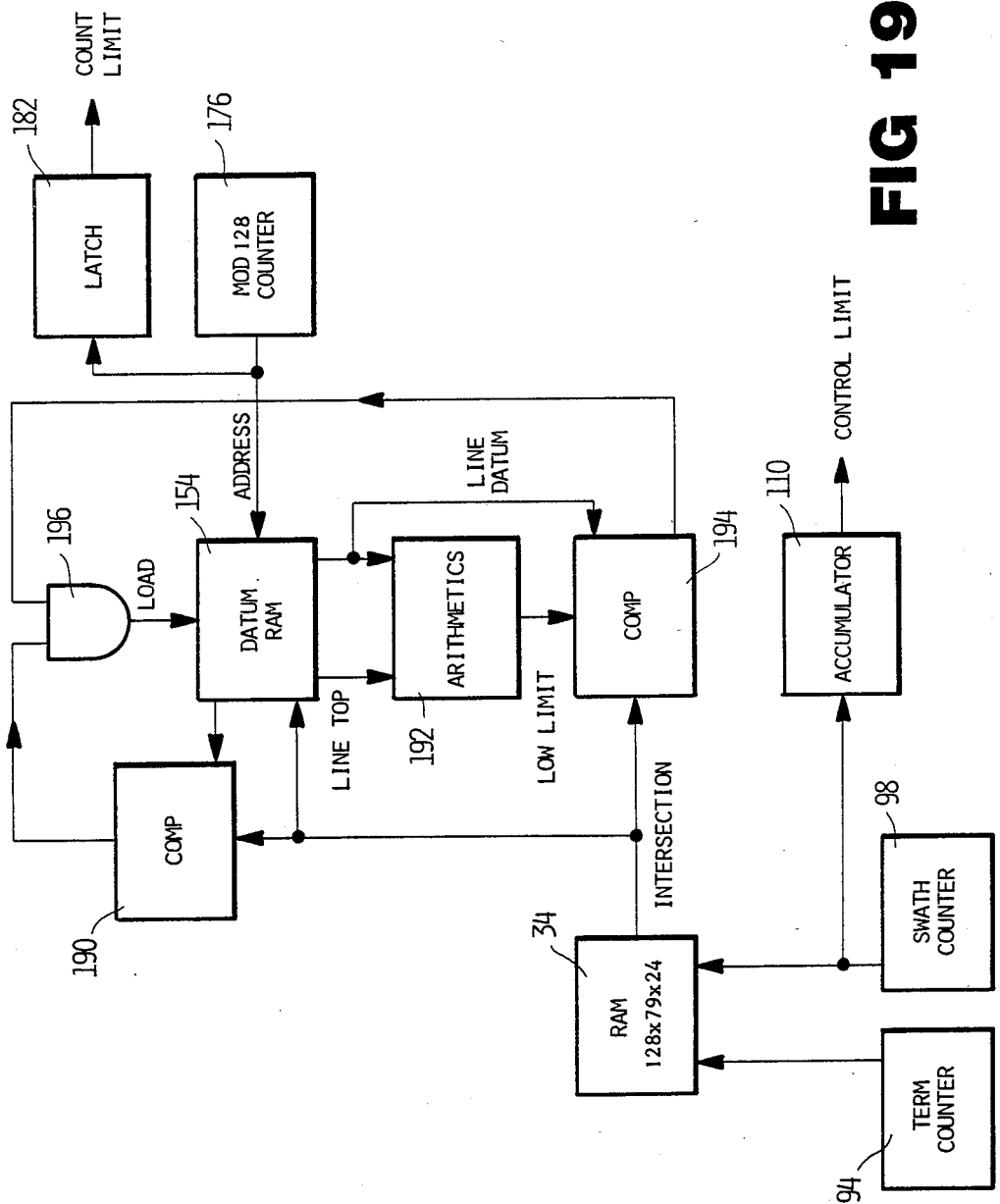
FIG. 19 is a block diagram illustrating logic for determining the text line bottoms in a manner similar to the logic of FIG. 18.
Figure 20:
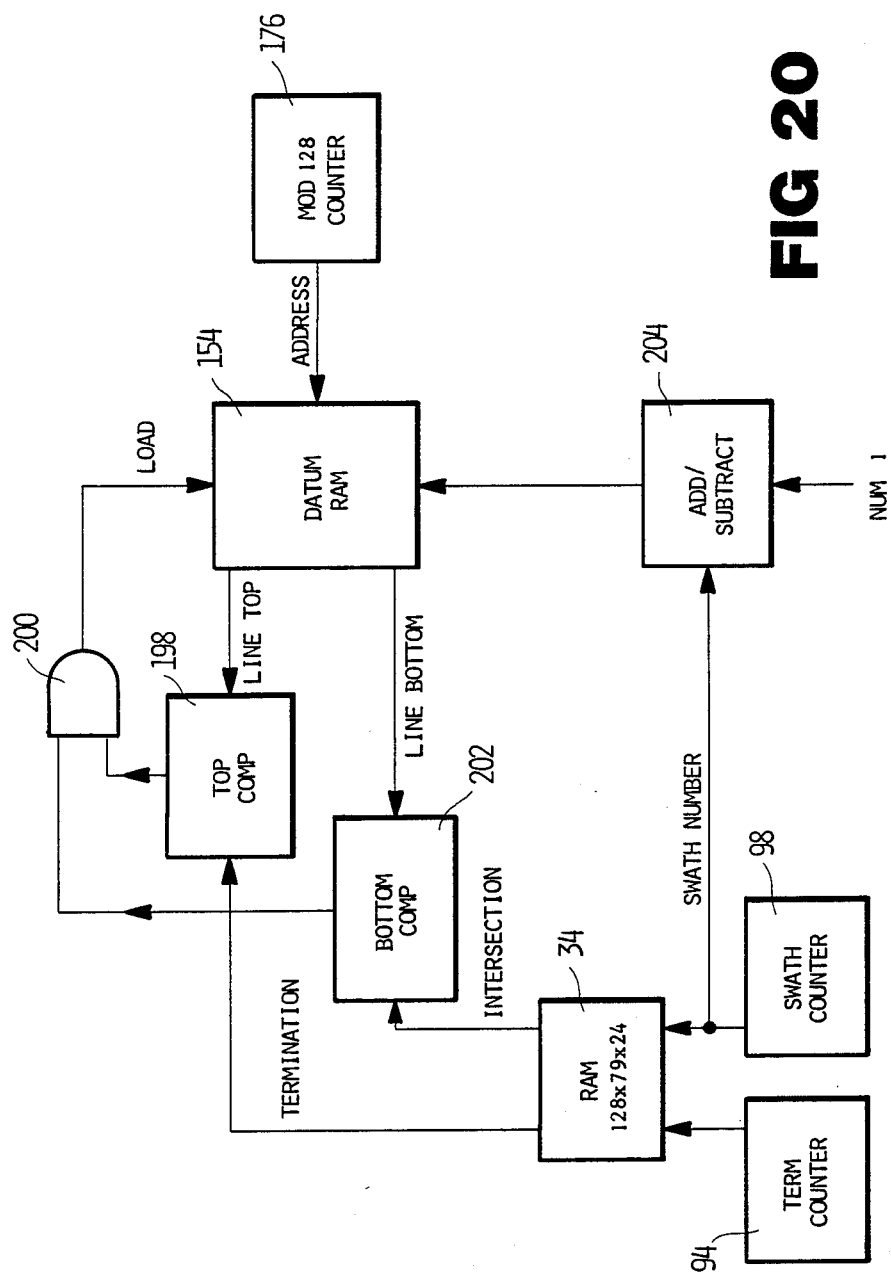
FIG. 20 is a block diagram of logic which will establish left and right boundaries of each line of text.
Figure 21:
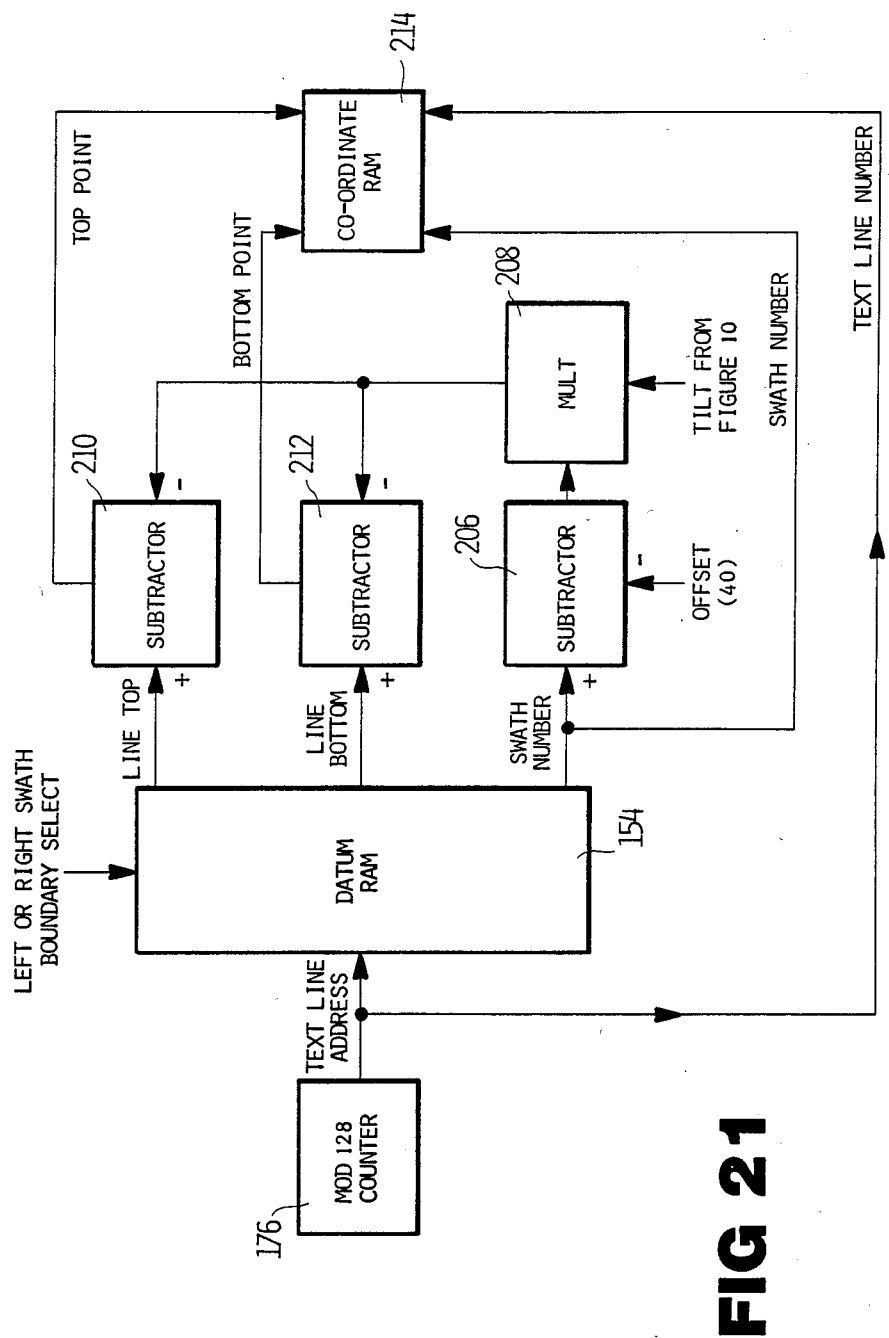
FIG. 21 is a block diagram of logic which will rotate the X and Y coordinates of the four points bounding each line of text back into the coordinate system of the original text.

Logic 322 in generalized flow chart form is shown in FIGS. 19-21 and will be described in detail hereinafter. Prior to that, however, the methodology and specific circuits employed by the assignee of the present application in a system presently under development and test will be discussed in detail.

TEXT LINE FINDING METHODOLOGY

Text line finding is sub-divided into two tasks, "Statistical Line Angle Finding" which determines the angle of the text lines; and "Line Bounding" which then locates each line of text and delimits it, i.e. determines the top, bottom, left, and right edges.

Statistical Line Angle Finding first utilizes a logical sequence labelled "Swath Formation" to gather statistical data on the positions of each line of text. These data are then utilized to determine the angle of the text lines. As mentioned above, the following detailed discussion is primarily of a system presently being developed and tested by the assignee of this application. In that system, a page is assumed to have a resolution of 200×200 pixels per inch. In practice, the actual resolution can be any value, as will be readily recognized by those skilled in the art. Many other possible variations within the scope and spirit of the present invention should be recognized by those skilled in the art from the following description.

SWATH FORMATION

Swath Formation is a logical sequence utilized to amass a list of "intersection and termination" data page address pairs for subsequent processing by Line Skew Angle Finding. Such information may, of course, also erroneously contain data on non-textual material which must be culled out as part of the subsequent processing.

Figure 5:
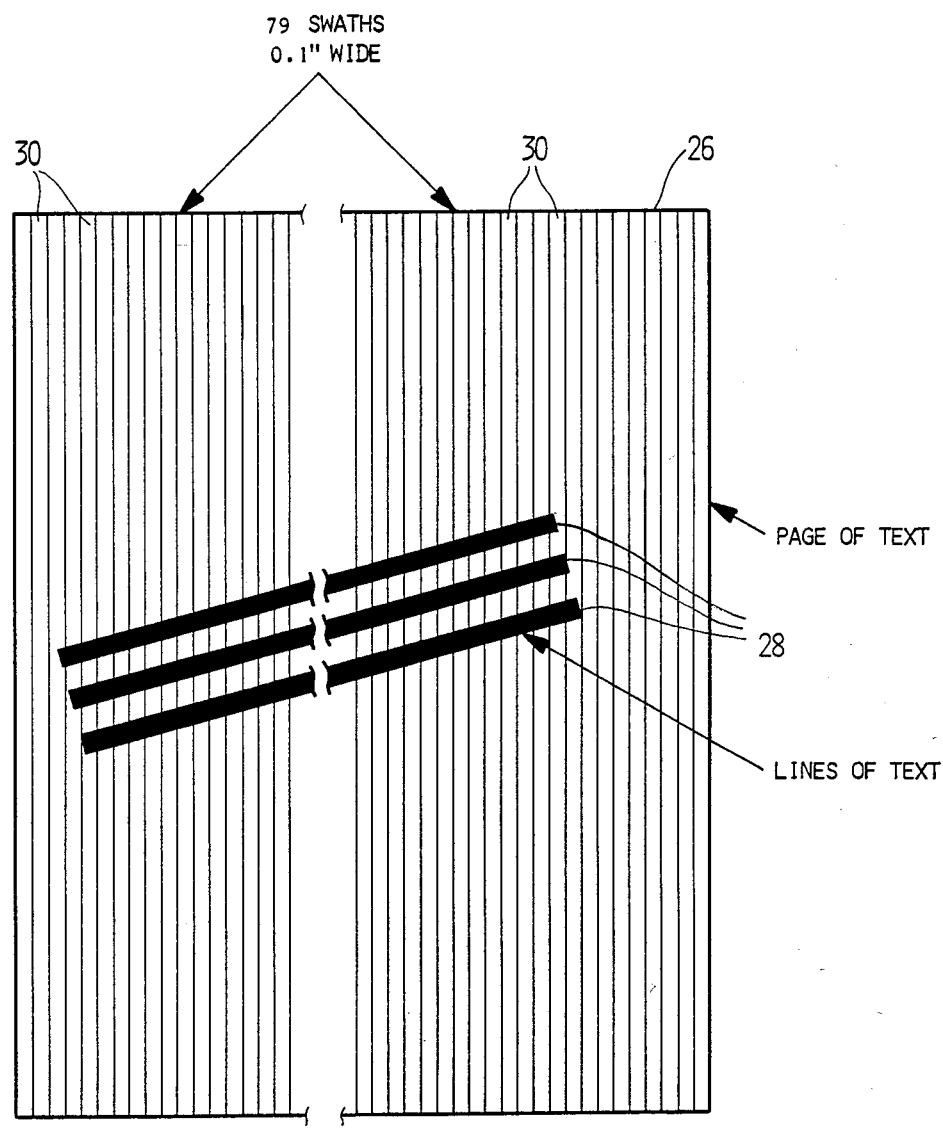
FIG. 5 is a simplified drawing of a portion of a line of text showing the swath system employed in the present invention.

FIG. 5 portrays a document 26 exhibiting three lines 28 of skewed text represented by the elongated black rectangles. The documents 26 in the system under development are segmented into 79 vertical strips or swaths 30; each being 0.1 inch wide (20 pels). The width and number of swaths in the system under development have been optimized by simulation for an 8½×11 inch page at 200×200 lpi resolution, but can vary according to resolution and application.

Figure 6:
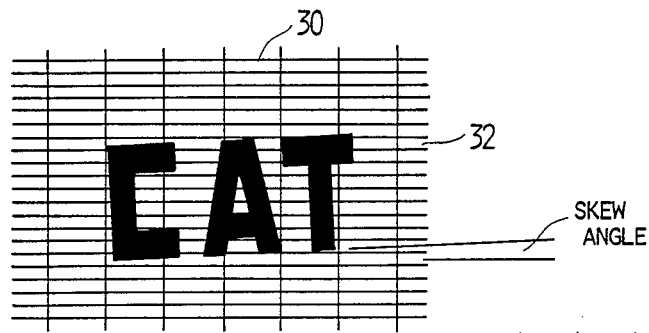
FIG. 6 shows the word CAT skewed with the swaths and vertical divisions superimposed thereon.
Figure 7:
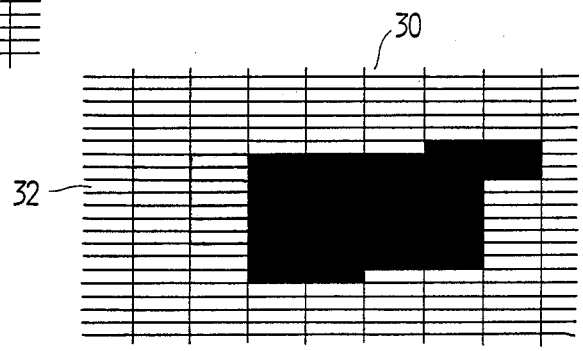
FIG. 7 shows the data of FIG. 6 with the vertical divisions of each swath containing at least one black pixel are made all black.

Turning now to FIG. 6, the letters "CAT" are shown skewed as they would appear superimposed upon the swaths 30 and vertical line addresses (i.e. rows) 32. By definition, in proceeding from the bottom of the page to the top, any black pixel in the 20 pel wide swath 30 causes all pels in that swath (at that vertical address) to also be declared black as shown in FIG. 7 for the characters of FIG. 6. This technique effectively reduces the page's horizontal resolution by a factor of twenty which, in turn, closes all inter-character spaces and many inter-word gaps. Vertical resolution it should be noted, however, is left unaffected. The above horizontal resolution reduction procedure is only applied for line finding; the actual full resolution image is held in memory pending the outcome of the line finding process.

Each swath 30 is next individually searched for "intersections" and "terminations". Starting at the bottom of the page, an intersection is defined, for example, as four white pixels followed by two black pixels. A termination is defined as two black pixels followed by four white pixels. This is one of the areas which will be recognized by those skilled in the art as being modifiable, as desired. When an intersection is found, its vertical address or location on the page is stored in a data buffer along with the swath number. A second intersection, following an initial intersection, is discarded if a termination does not intercede. Similarly, the page vertical address of a termination is stored with its swath number, providing it is preceded by an intersection. Extraneous terminations, like extraneous intersections, are ignored. Thus, intersections and terminations are stored in an Intersection Buffer as data pairs of vertical addresses with their associated swath numbers, i.e. as intersection/termination pairs.

Next, a distance criteria is applied to the effect that any spacing less than 0.05" (10 pels) or greater than 0.15" (30 pels) is cause to discard a pair. This is a form of spatial filtering which favors normal sized lines of text, and eliminates undersized lines (which can not be recognized for lack of resolution anyhow), as well as oversized (non-textual) graphics. It should be noted that some non-textual material can satisfy the distance criteria and be accepted. The subsequent satistical analysis, however, supresses the artifact information.

Figure 8:
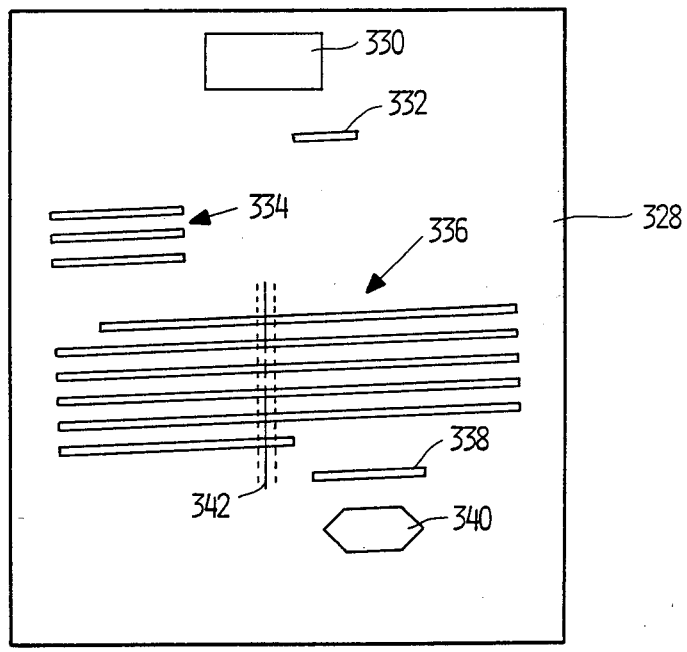
FIG. 8 is a simplified drawing of a skewed business letter showing its various component parts.

FIG. 8 shows in simplified form the elements of a typical business letter generally indicated as 328. The company logo appears at 330. The date is at 332 and the address and greeting at 334. The body is at 336 with the closing and signature at 338 and 342 respectfully. As will be seen and realized from the discussion herein, the width criteria applied to the initiation/termination pairs will reject most logos 330 and signature information 340 since they are too wide to be text lines. As will be seen further, the date 332 is very likely be rejected later on as being too short to be determined. Such rejection, however, is only for the purpose of angle finding. Line bounding does delimit such entries. As will be recognized, what is being developed is a base vector swath lying along the line 342 for a series of lines within the body 336 providing data having the highest probability of being representative of the actual textual layout of the letter 328.

Figure 9:
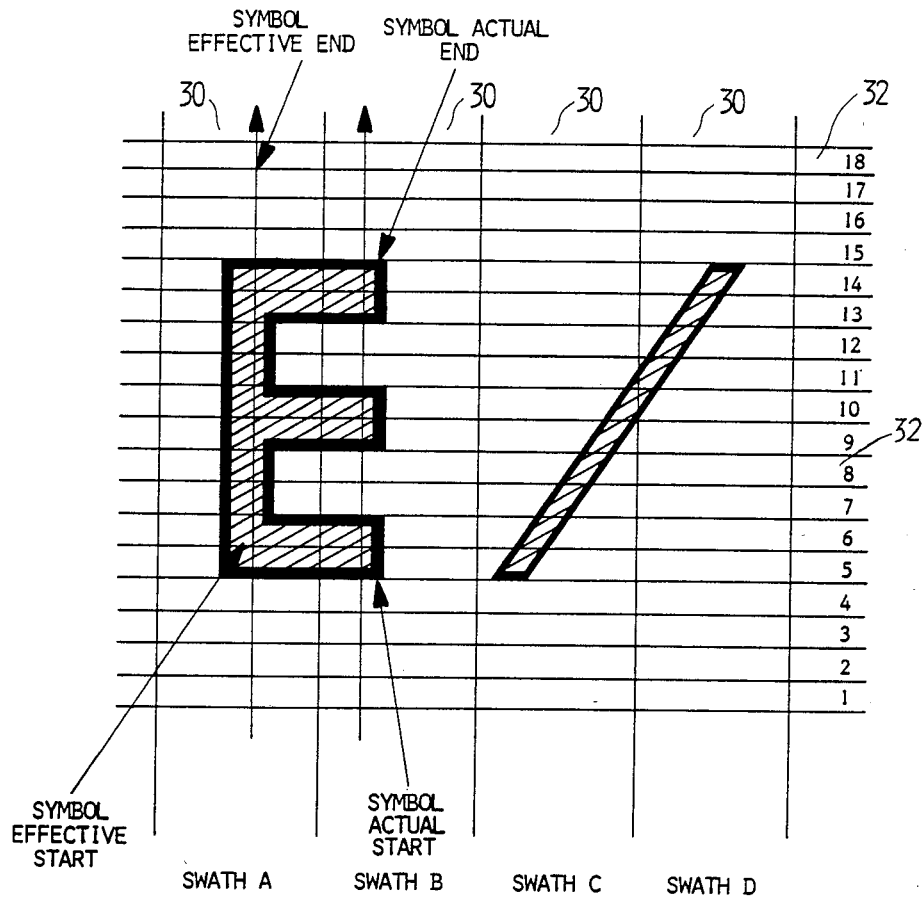
FIG. 9 is an enlarged drawing showing two characters as they relate to the swath and vertical addresses approach of the present invention in the establishment of intersections and terminations.

FIG. 9 illustrates (without the fill-in discussed above) the initiation/termination scanning procedure with four swaths (labeled A to D) and eighteen labelled vertical page positions. In swath "A", the effective symbol intersection is at level 6, and the corresponding termination is at level 18. Correlation techniques, of course, always introduce such data displacement, which is simply allowed for in subsequent computation. This first data pair has a vertical spacing of twelve pixels and is, therefore, acceptable. Swath "B" is characterized by one data pair, since the internal structure of the letter "E" is ignored due to the pel pattern processing criteria discussed above. The diagonal symbol straddling swaths "C" and "D" produces no usable data pairs for distance criteria. The intersections, without their terminations, are sent to the Statistical Line Angle Finding logic to be discussed hereinafter. The Line Bounding logic, however, requires both the intersections and terminations of the data pairs, so that data is not discarded. The maximum number of pairs per swath is also stored in the Maximum Pair Buffer for subsequent use in a manner to be described hereinafter.

LINE SKEW ANGLE FINDINGS BY LINEAR REGRESSION

Circumscribing (bounding) the lines of text on a page is greatly simplified if the page skew is first ascertained. This approach is, therefore, employed in the present invention. The skew angle information is utilized to "derotate" the page before bounding each text line. Thereafter, the text line bounding co-ordinates are rotated back into their initial orientation.

The Maximum Pair Buffer (containing the number of intersection pairs per swath) is examined swath by swath for the largest number; which could also be resident for more than one swath. The rightmost swath on the page, characterized by that maximum number, is initially chosen as a base from which skew angle determination then proceeds. This array is termed the "Base Vector".

The lower vertical page address (VB) in the Base Vector may or may not lie on a text line, but is initially chosen as if it does. Term VB is entered into an array labeled "Line Array", along with its associated swath number. The swath immediately to the left of the Base Vector is then scanned for a vertical intersection page address within (for example) 10 pixels of VB (i.e., 0.05"). This threshold allows for hangdown characters. Assume that such an address is found. It then becomes the second entry into the Line Array, and it also becomes the new VB. The next swath to be left is then scanned for an address within 10 pixels of the new VB, and an entry into the Line Array is made if one is found. This process continues until one or more of four "impediments" (as defined hereinafter) occurs; at which time scanning commences to the right of the Base Vector. Right search proceeds in a similar manner to the above-described left search until an impediment is reached once again. The accumulated data is then processed before proceeding to the next term in the Base Vector.

The impediments (based on the above example conditions) are:

(a) Attaining swath #1 for left search or swath #79 for right search.
(b) Finding a swath containing no Intersection Pairs.
(c) More than 100 "hits" accumulated.
(d) Finding four swaths in sequence containing no acceptable Intersection Pairs.

Further as to Item (d), when a search of an adjacent swath finds no vertical address within 10 pixels (0.05") of VB, that VB is retained, and the search continues at the next swath, etc. If the fourth swath over contains no Intersection Pairs, the search mode terminates. No entries are made into the Line Array for skipped swaths. Skipping swaths accommodates to inter-word spaces.

While the searching is in progress, a running sum is maintained of the number of entries into the Line Array. When the search is complete, the sum is compared to a threshold to assure a sufficiently high population for the next procedure, as too low a number could be indicative of non-textual material or a short textline. As an example, a minimum of 15 hits per search are required to continue in the system under development.

A low hit number causes the Line Array data to be discarded for that line only. An acceptable hit number permits data retention. In either case, the next vertical Base Vector term is chosen. All procedures repeat until the terms in the Base Vector are exhausted. A running sum is also taken of the number of apparent text lines. Too small a number renders the statistics being developed suspect, such that the tilt of the page probably cannot be found accurately. Such matters are subject to the discretion of the implementor.

The Line Array data thus complied is then analyzed by a technique of Linear Regression, which fits the best straight line to be retained data in the array. Linear Regression is a standard mathematical procedure well known to those skilled in the art, and is documented in a number of text and reference manuals. For that reason, it is not discussed in detail herein. Linear regression is only one method of finding the best fit of a straight line to an ensemble of points. It should be understood that the present invention is not intended to be restricted to this one methodology being described herein. No use is made of the Y Intercept analysis, however. The basic formula (Equation I) is:

$$\text{TILT} = \frac{\sum_{L=1}^{M} \sum_{i=1}^{N(L)} [(X_i - \overline{X}_L)(Y_i - \overline{Y}_L)]}{20 \cdot \sum_{L=1}^{M} \sum_{i=1}^{N(L)} (X_i - \overline{X}_L)^2}$$

Where: $\overline{X}_L = \frac{1}{N(L)} \sum_{i=1}^{N(L)} X_i \quad \overline{Y}_L = \frac{1}{N(L)} \sum_{i=1}^{N(L)} Y_i$ And where:
$X_i$, $Y_i$—coordinates of point ensemble
L—apparent text line number
$X_L$—horizontal mean of points on text line L
$Y_L$—vertical mean of points on text line L
M—number of apparent text lines Note: The expression is divided by 20 since each swath contains 20 pixels. Appropriate adjustment would be necessary if a different value is employed.

The term "apparent text line" is employed in preference to "text line" for the above definitions since there is no guarantee that any ensemble of points (even though >15) lies on a true line of text. Should an extraneous grouping be incurred, the statistical analysis does tend to suppress its effect, however.

An alternate form of the linear regression technique utilizes the following expression which has the advantage over the prior expression in that individual apparent text line means do not have to be computed and subtracted from each term. Equation II is as follows:

$$\text{TILT} = \frac{1}{20} \cdot \frac{\sum_{j=1}^{N} \sum_{n=1}^{M(j)} X_{nj} Y_{nj} - \sum_{j=1}^{N} \left( \frac{\sum_{n=1}^{M(j)} X_{nj} \cdot \sum_{n=1}^{M(j)} Y_{nj}}{M(j)} \right)}{\sum_{j=1}^{N} \sum_{n=1}^{M(j)} X_{nj}^2 - \sum_{j=1}^{N} \left( \frac{\left( \sum_{n=1}^{M(j)} X_{nj} \right)^2}{M(j)} \right)}$$

Where:
n—Term number on apparent text line j
$X_{nj}$—Horizontal co-ordinate of term on apparent text line j
$Y_{nj}$—Vertical co-ordinate of term on apparent text line j
M(j)—Number of terms on apparent text line
N—Number of apparent text lines j Note: As in the first equation (Equation I), the expression is divided by 20 since each swath contains 20 pixels.

Both Equation I and Equation II have been implemented and provide answers very close to one another. The choice of which formula to incorporate into the system logic is, then, dependent upon which is simpler to implement for a given application. The circuit description contained hereinafter utilize the second formula (Equation II).

Text Line Bounding by Statistical Means

The angle finding algorithm employed as part of the method of the prior section ascertains tilts to better than 4 arc minutes. Only the computed document tilt information is carried out to the Statistical Line Finding logic since the prior text line tracking information is purposely restricted so as to avoid non-textual data. Once page tilt has been determined, line bounding can be performed more aggressively. This is a bootstrap type operation.

Data in the Intersection Buffer is deskewed on a swath by swath basis according to the following formula (Equation III):

$$\text{CORRECTION} = (S_n - S_o) \cdot \text{TANGENT } \theta \qquad \text{Equation III}$$

Figure 10:
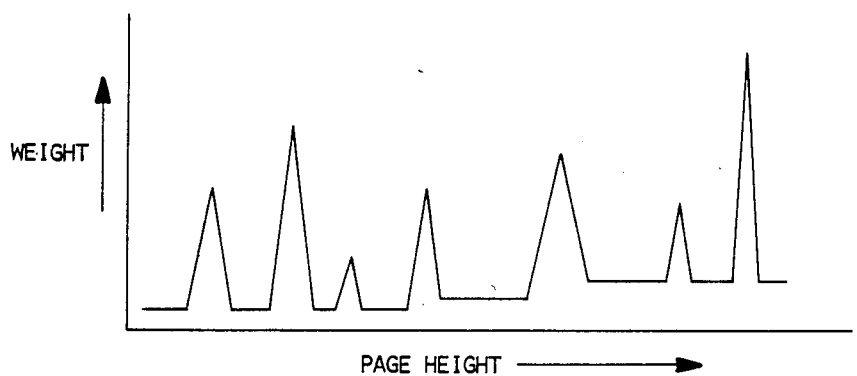
FIG. 10 is a graph of the data in the histogram buffer consisting of a multi-element line spectra where the peaks represent the most probable position of the text line datums.

Term $S_o$ is ordinarily the central swath number; while $S_n$ is the number of the swath whose data is being deskewed. A computed fixed correction is added to all terms in each swath of the Intersection Buffer. A one dimensional Histogram Buffer, whose length is equal to 2,200 pixels (11 inches ÷ 0.005 inches), is loaded from the data contained in the deskewed Intersection Buffer in the following manner: Each element in the two-dimensional Intersection Buffer is examined, and the number of times each vertical page address comes up is loaded into the appropriate slot of the Histogram Buffer. For example, if vertical page address 1,511 is detected 30 times, the number 30 is loaded into position 1,511. Data in the Histogram Buffer then consists of a multi-element line spectra as shown graphically in FIG. 10, where the peaks represent the most probable positions of the text line datums. The height of each peak and the individual variances of the line spectra are important. Under-sized peaks are discarded as possibly representing non-textual data. Broad distributions are indicative of large random variations of characters around their text line datums. Ideally, of course, the histogram should coalesce into tall line spectra. Information between peaks is typically the result of optical noise, non-textual data, etc.

Once datums are established by histogram analysis, all of the intersections lying vertically within a few pixels of each datum are identified as belonging to a specific line of text. It will be recalled that each intersection is associated with a termination address. For each identified line of text, the de-rotated intersections are grouped along with their terminations. The highest termination addresses then bound the tops of the text lines.

Measures of text line heights are achieved by subtracting the datum addresses from the tops of lines' addresses. Fixed percentages of these differences are taken to form windows below the datums. The lowest address intersections in these windows define the text line bottoms. If there are no hangdown characters, the bottoms of the text lines are virtually coincident with the datums. P To find the left boundary of any one text line, the leftmost intersection-termination data pair, falling on or completely within the line's top and bottom periphery, is chosen. Similarly, the right boundary is declared for the rightmost data pair falling on or within the top and bottom boundaries. Four points now exist in each case which define the corners of rectangles emcompassing respective ones of the text lines. The left boundary in each case is arbitrarily moved one swath further left to allow for the effect that an intersection on the extreme left edge of a character may occur more than 20 pixels above the text line datum. If that were the case, that intersection could have been discarded, making the text line to appear shorter than it really is. The added swath corrects for this possibility. Similarly the right boundary in each case is arbitrarily moved one swath further to the right. The corner points are then rotated back into their original orientation to complete the line finding process.

INTERSECTION/TERMINATION PROCESSING

Figure 11:
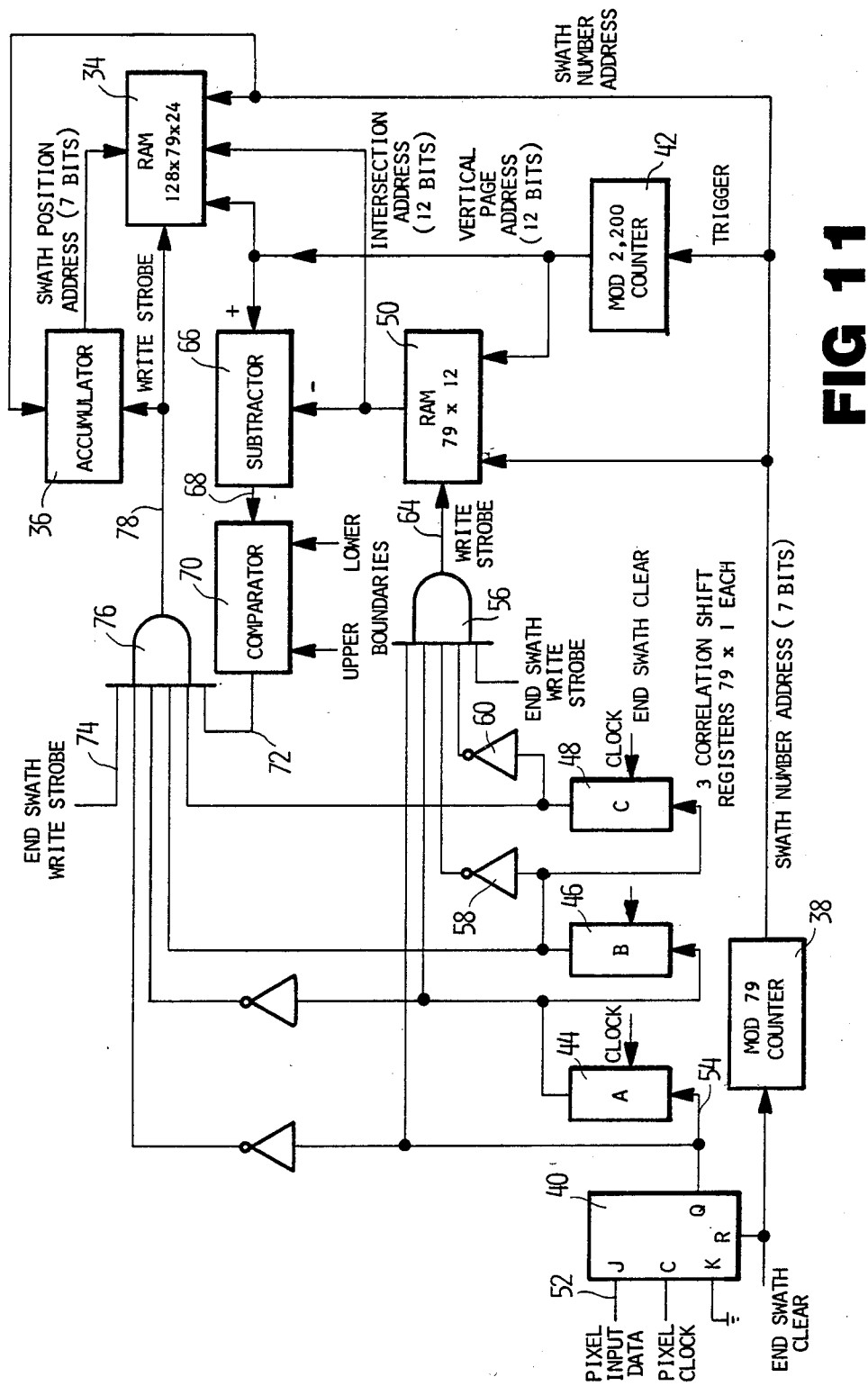
FIG. 11 portrays a possible hardware configuration for the formation of swaths and intersection/termination data address pairs.

FIG. 11 portrays a possible hardware configuration for the formation of swaths and intersection/termination data address pairs. In order to simplify the illustration, intersections have been redefined as two white pixels succeeded by two black pixels, while terminations have been redefined as two black pixels followed by two white pixels. The basic architecture of FIG. 11 is easily extensible by those skilled in the art without undue experimentation to other patterns of pixels. A further illustrative simplification is realized by causing the aforesaid pixel patterns to be mirror images of one another. By this technique it is never possible for two terminations to be in a row without being separated by an inersection. The converse is also true for intersections. Mirror image patterns are not required by the methodology of the present invention, and any non-symmetry can be accommodated by slight additions to FIG. 11 which would be obvious to those skilled in the art.

Figure 12:
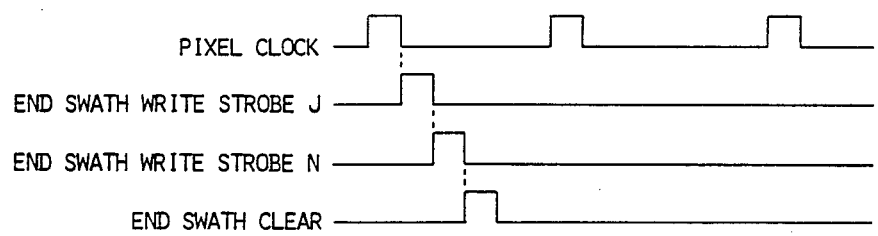
FIG. 12 is a drawing of the timing wave form patterns used to drive the circuit of FIG. 11.

Operation of the circuitry of FIG. 11 is governed by application of the timing waveform patterns shown in FIG. 12 from an appropriate source (not shown). The processed data is stored in RAM 34 which contains intersection and termination data address pairs stored in a swath by swath organization of 24 bits per address pair. Data from RAM 34 is further processed in FIG. 13. Additionally, Accumulator 36 in FIG. 11 stores the numbers indicative of the quantity of data pairs per swath, which information is also required for subsequent processing.

The architecture indicates that data is entering on a scanline by scanline basis without any inter-scanline dead time. This condition is not the usual case, but is employed in this discussion for simplification. The circuitry is also easily adaptable to the more usual application employing dead time.

OPERATION

The timing waveforms of FIG. 12 are generated and input to the circuit of FIG. 11 at the end of each 20 pixel wide swath. Initial synchronization for each scan line is expected to be provided by the mechanism scanning the document. At the start of scan, the output of Modulo 79 Counter 38 is set to zero and Flip Flop 40 is cleared. A start-of-page signal is also generated which clears Modulo 2,200 Counter 42 and Accumulator 36, and causes the Correlation Shift Registers 44, 46, and 48 to load all zeroes. Data in RAM 50 and RAM 34, do not require clearing since they are overwritten.

The Pixel Clock input to Flip Flop 40 causes the continual sampling of the Pixel Input Data being input to Flip Flop 40 at 52. Should any one of the 20 pixels in a swath be black, Flip Flop 40 clocks so that its Output 54 goes high. Once clocked, Output 54 stays high regardless of the remaining pattern of pixels within the swath. At the end of a swath, Output 54 is processed and Flip Flop 40 is cleared in order to be receptive to data on the next swath.

Output 54 drives the three Shift Registers 44, 46 and 48 which are connected in tandem. Each register 44, 46, 48 is 79 swaths wide. Thus, data on the swath just passed is available as well as data on the prior three scan lines for that swath. Gate 56, in conjunction with Inverters 58 and 60 and the End Swath Write Strobe which is input at 62, produce an output pulse at 64 if the present and last scans are black and the remaining two are white—i.e. the intersection criteria. This output pulse on line 64 then causes the vertical page data from Modulo 2,200 Counter 42, to be loaded into the proper swath slot in RAM 50. Any old data is over-written. The Counter 42 is indexed every scan line, or after 79 pulses from Counter 38. Counter 38 also provides the swath address for RAM 50.

Without the write strobe from Gate 56, RAM 50 provides the last vertical page address stored to Subtractor 66, which receives as its second input the present vertical page address from Counter 42. The Subtractor 66 difference on line 68 is input to Comparator 70, the output 72 of which goes high if the difference is over a prescribed low limit and under a prescribed high limit. Output 72, output 54, and the outputs of Registers 44 and 46, along with the End Swath Write Strobe at 74 are all input to Gate 76. Thus, Gate 76 only energizes if a known intersection and a candidate termination exhibit a separation characteristic of typical text line height. If the present and prior swath scans are white, while the earlier two are black, the output of Gate 76 is pulsed; assuming the End Swath Write Strobe input at 74 is also present—i.e. the termination criteria.

The pulse output at 78 from Gate 76 causes RAM 34 to load the intersection and termination addresses into the swath slot designated by Counter 38. Accumulator 36 provides the position address in each swath to RAM 34, and also maintains a running sum of the number of intersection and termination pairs for each swath. When the document is fully processed, Accumulator 36 contains a record of the total number of address pairs in each swath. During page processing, however, Accumulator 36 provides a set of address lines to RAM 34.

The portion hereinbefore describing the methodology for deriving the intersection/termination data pairs mentioned vertical offsets which are typically incurred when corrrelating the vertical patterns of black and white pixels. These offsets can be easily corrected in the circuit of FIG. 11 by adding two subtractors—one to each data input to RAM 34. The subtrahends to each subtractor are constats, depending upon the correlation patterns employed.

BASE VECTOR

Figure 13:
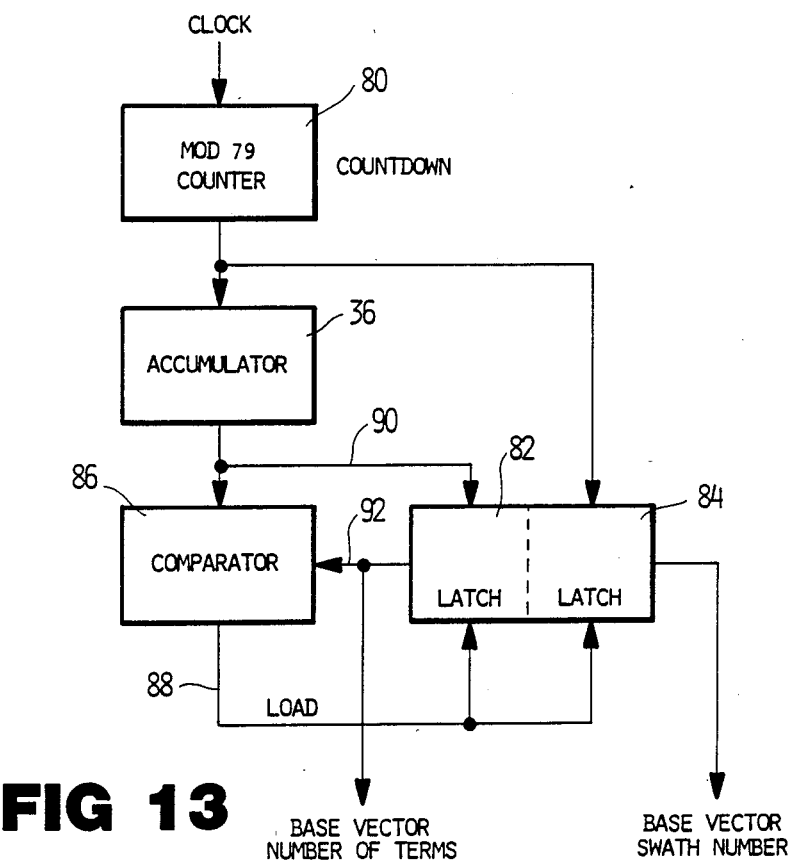
FIG. 13 is a block disgram exhibiting the methodology by which the base vector swath number and the maximum number of terms in that swath are placed in random access storage for the line tracing logic circuit.
Figure 14:
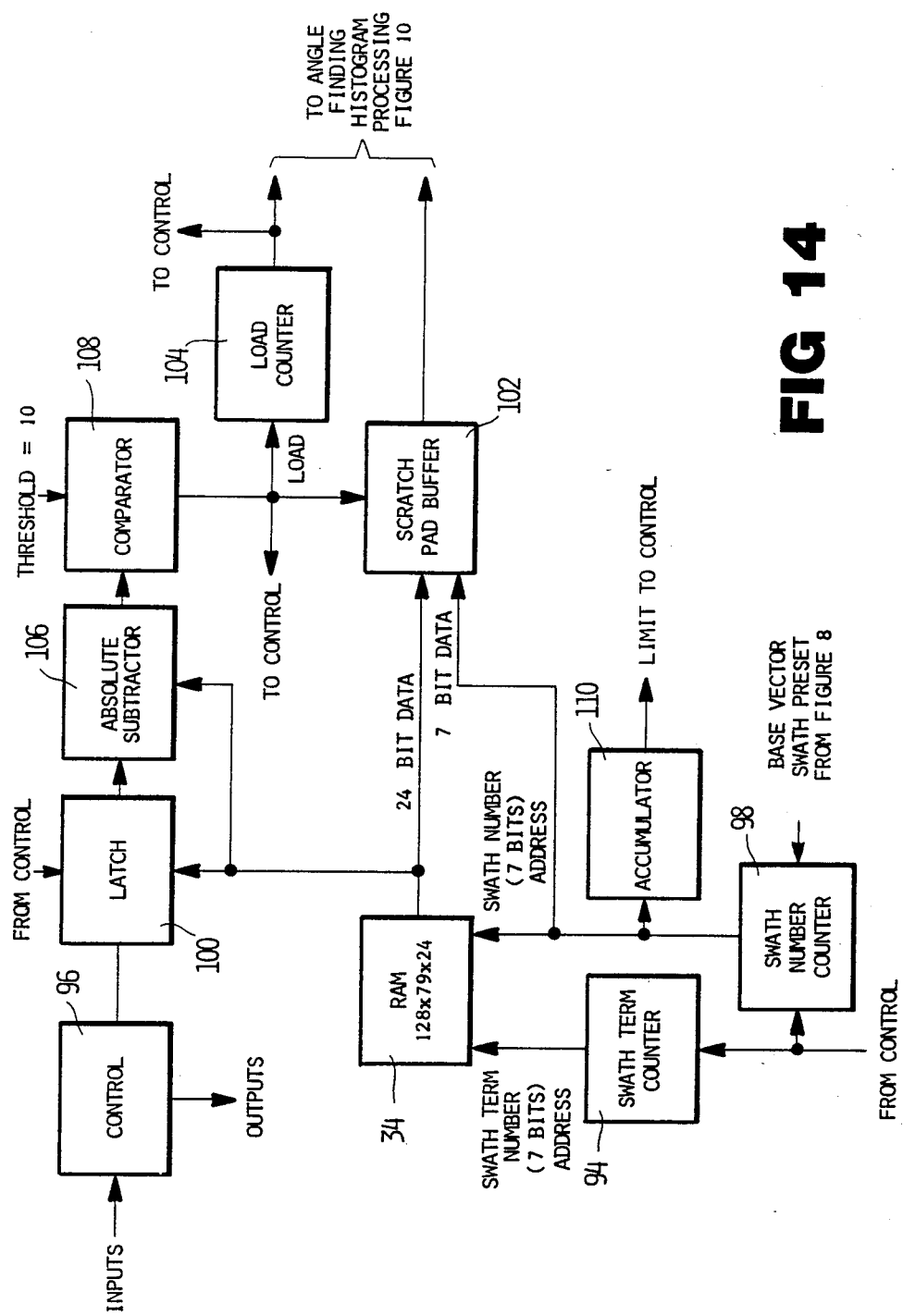
FIG. 14 is a block diagram of a circuit by which the intersections contained in RAM 34 of FIG. 11 can be formed into groups congregating around the apparent lines of text.

FIG. 13 demonstrates a circuit exhibiting methodology by which the Base Vector swath number, and the maximum number of terms in that swath, are placed in random access storage for the Line Tracing logic circuit depicted in FIG. 14. Initially, Modulo 79 Counter 80 is preset to a count of 79, while Latch 82 is cleared. Since Latch 84 is overwritten, its initial state is not important. The Accumulator 36 in FIGS. 11 and 13 are the same circuit element.

Counter 80 initially addresses Accumulator 36 in FIG. 13 at the 79th swath. Assume that one or more intersection/termination data address pairs are contained in that swath. Comparator 86, therefore, would generate an output at 88 since its input 90 exceeds its input 92, which is now a zero. The Comparator 86 output at 88 instructs Latch 82 to load the number of terms in the 79th swath, while Latch 84 stores the swath address number (i.e. 79).

Counter 80 is then decremented to address the 78th swath in Accumulator 36. If the number of terms for the 78th swath in Accumulator 36 is greater than that stored in Latch 82, both Latches 82, 84 are again updated, otherwise the data in the Latches 82, 84 is left intact, and the Counter 80 is again decremented. That process continues until all swath positions in Accumulator 36 are addressed. At that time, Latch 82 holds the number of terms in the Base Vector, while Latch 84 holds the address of the Base Vector.

LINE TRACING FOR ANGLE FINDING

FIG. 14 illustrates the method by which the intersections contained in RAM 34 of FIG. 11 are formed into groups congregating around the apparent lines of text. As mentioned above, the comparison termination data are not required for angle finding. Not all intersections are chosen since the various restriction as described are placed on the selection process. The selected intersections are processed by the logic circuit of FIG. 15 to compute the document skew angle. Once the skew angle is know, all of the address pairs in RAM 34 of FIG. 11 are evaluated to bound the text lines.

Returning to FIG. 14, Swath Term Counter 94 is initially reset by Control 96 to address the first intersection in RAM 34 in the Base Vector swath as addressed by Swath Number Counter 98. Counter 98 is preset by Control 96 from the Base Vector swath number as ascertained in the logic of FIG. 13. Control 96 next instructs Latch 100 and Scratch Pad Buffer 102 to accept the intersection data from RAM 34. Scratch Pad Buffer 102 also accepts at this time the swath number. The address for Buffer 102 is provided by Load Counter 104; also under the aegis of Control 96.

Counter 98 is next instructed to decrement one swath down from the Base Vector position. Counter 94 then addresses the first intersection in that swath which is subtracted in Absolute Subtractor 106 from the data stored in Latch 100. The output of Subtractor 100 is absolute (i.e. unsigned), and is compared against the chosen threshold value of 10 in Comparator 108. If Comparator 108 accepts the data, it is loaded into Buffer 102 and Load Counter 104 is incremented one position. Counter 104 maintains a count equal to the number of terms stored in Buffer 102.

Data acceptance causes the Swath Number Counter 98 to decrement again to start the search at the first term in the next lower swath number. Should Comparator 108 ever reject an intersection, Swath Term Counter 94 increments to address the next term in that swath, and the difference comparison text is re-applied. Continued data rejection causes Counter 94 to repeatedly step up until the count equal the value stored in Accumulator 110 as addressed by Swath Number Counter 98. An empty swath causes Counter 98 to be decremented and Counter 94 to be reset. It should be recognized from the earlier description herein that Buffer 102 only loads on acceptable data and Counter 104 only advances for the same reason. If three swaths in sequence contain no acceptable intersections, or if swath #1 is attained, Swath Number Counter 98 is preset one position to the right of the Base Vector Swath. Search then continues to the right of the position of the Base Vector swath and terminates if three swaths in a row contain no intersections or swath #79 is attained.

At the end of a scan, the contents of Counter 104 are examined. If under fifteen, the contents of Scratch Pad Buffer 102 are dumped as representing poor statistics. An acceptable number causes the Scratch Pad Buffer 102 data to be processed by the logic of FIG. 10 and the subsequent intermediate results are held until the entire page is scanned.

Once the data in Buffer 102 is processed, Counter 98 is preset to the Base Vector position and Counter 94 is preset to the second term. That procedure continues until all of the Base Vector terms are consumed. At that time, a final check is taken of the number of apparent scan lines. Any number under 15 raises the question of poor statistics.

SKEW COMPUTER LOGIC

Figure 15:
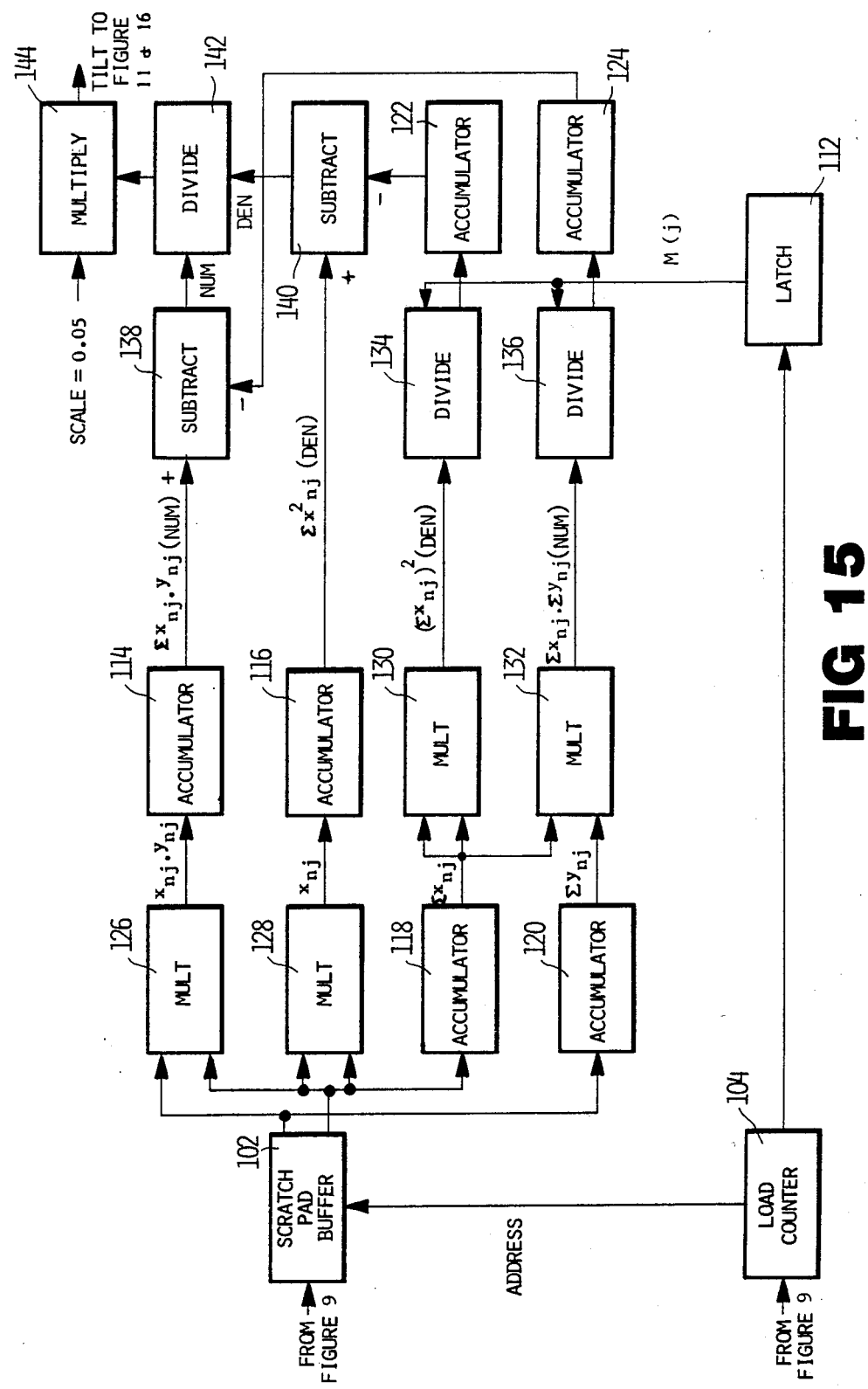
FIG. 15 is a block diagram of deskewing logic which implements Equation II for linear regression analysis.

FIG. 15 is a block diagram of the Skew Computer Logic which implements Equation II for linear regression analysis. Scratch Pad Buffer 102 and Load Conter 104 are the same circuit modules appearing in FIG. 14 except that data is now being taken from these entities rather than entered into them.

Initially, Load Counter 104 contains the maximum number of terms contained in Scratch Pad Buffer 102. Latch 112 stores this data, at the start of the apparent text line analysis procedure, so as to free Load Counter 104 which then counts down while addressing Buffer 102. At the start of the page, Accumulators 114, 116, 118, 120, 122, and 124 are cleared. Accumulators 118 and 120 are further cleared prior to processing each apparent text line.

For each address produced by Counter 104, the X and Y coordinates of an apparent text line term are recalled. Multiplier 126 forms the product of these values, which are then summed in Accumulator 114 for all terms on the page, not just on an apparent text line. The X coordinates of all page terms are squared in Multiplier 128 and are summed in Accumulator 116, also not just on an apparent text line. Accumulator 118 sums all of the X coordinates of the terms for one apparent text line while Accumulator 120 sums all of the Y coordinates for that text line. The logic circuitry of FIG. 14 then reloads Buffer 102 and Counter 104 for the next apparent text line while the logic circuitry of FIG. 15 completes any processing in progress on the previous text line.

After the text line term coordinates are extracted from Buffer 102, the X sum is squared in Multiplier 130, while the product of the X sum and Y sum values is produced by Multiplier 132. Both sums are respectively divided by the number of terms on the apparent text line M(j) in Dividers 134 and 136.

The scaled X sum squared terms are summed in Accumulator 122 for the entire page, while the scaled product of the X sum and Y sum terms are summed in Accumulator 124, also for the entire page.

Once the page is fully scanned, the contents of Accumulator 124 is subtracted from the contents of Accumulator 114 in Subtractor 138. Similarly, the contents of Accumulator 122 is subtracted from the contents of Accumulator 116 in Subtractor 140. The contents of Subtractor 138 is divided by the contents of Subtractor 140 in Divider 142, the output of which is scaled in Multiplier 144 to produce the document tilt (i.e. the tangent of the skew angle). The logic of FIG. 16, however, only requires the unscaled page tilt as obtained directly from the output of Divider 142.

DE-ROTATION

Figure 16:
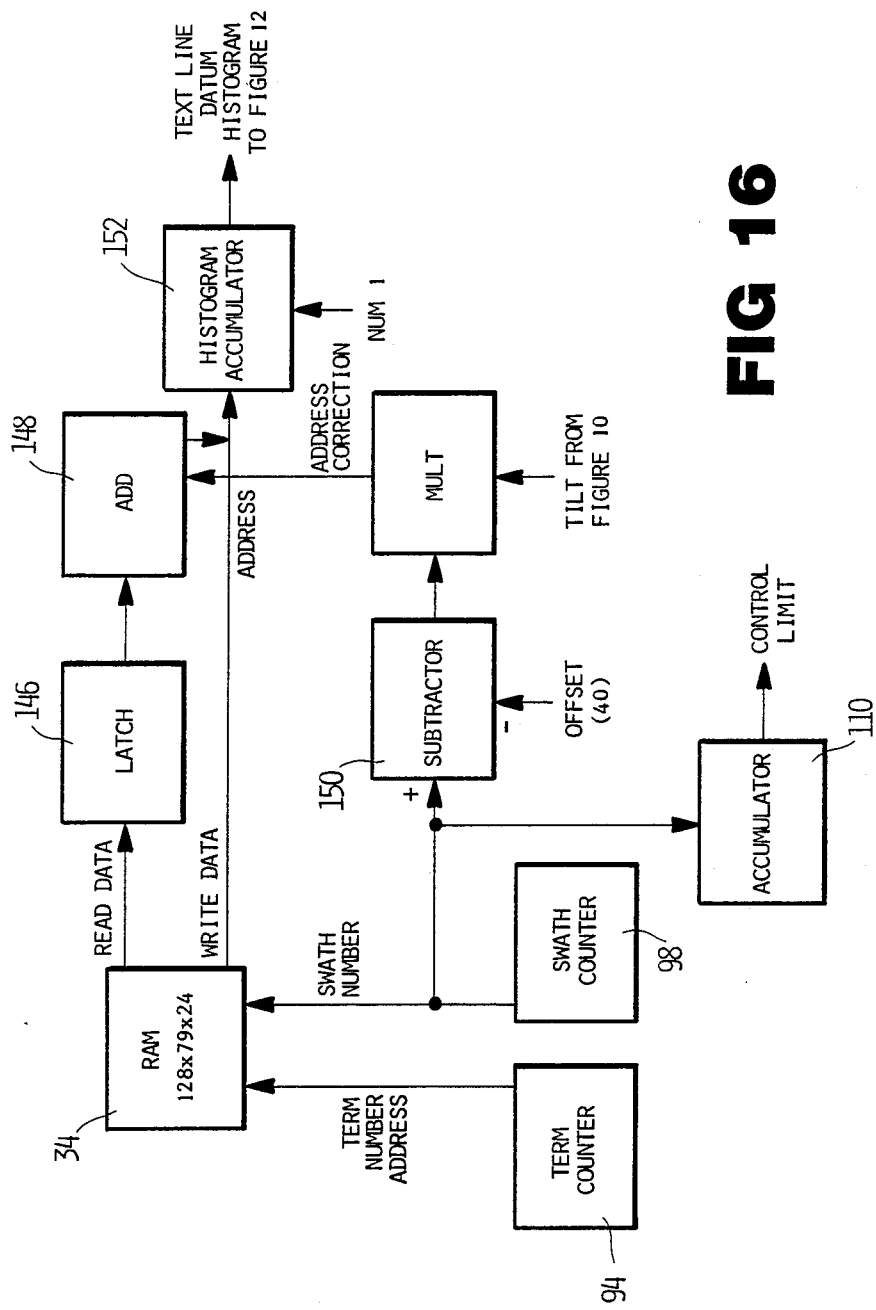
FIG. 16 is a block diagram illustrating the method by which data in RAM 34 of FIG. 14 is derotated.

FIG. 16 illustrates the logic of the method by which data in RAM 34 of FIG. 14 is de-rotated. This is a pseudo de-rotation not de-rotation in the strictest mathematical sense, since only fixed increments of vertical offset are added to the data terms in each swath according to Equation III.

FIG. 16 contains RAM 34, Term Counter 94, Swath Counter 98, and Accumulator 110, which are the same circuit modules shown in FIG. 14. Swath Counter 98 initially addresses swath #1 in RAM 34 and the Term Counter 94 sequentially addresses all elements in that swath. Accumulator 110, as before, specifies the number of terms in swath #1 so as to restrict the scanning range of Counter 94. Counter 98 next increments one count to address swath #2, and Term Counter 94 again scans the range dictated by Accumulator 110. This process continues until all terms in RAM 34 have been addressed. The $n^{th}$ term intersection/-termination address pair stored in RAM 34 is altered as follows: The data pair is read from RAM 34 and held in Latch 146, the output of which is summed with the vertical address correction in Adder 148. The corrected data address pair is written back into the same location in RAM 34 where the uncorrected information was initially stored.

Address correction is obtained by subtracting a numeral 40 offset from the swath number in Subtractor 150. Thus swath #40 requires no correction while swaths #1 and #79 require maximum correction. The output from Subtractor 150 is multiplied by the tangent of the page skew angle developed in FIG. 15 to obtain the required correction.

The intersection address components of the corrected data pair from Adder 148 also address Histogram Accumulator 152, which is cleared at the start of page processing. Accumulator 152 is 2,200 elements long and maintains a running count of the number of times each address is selected by Adder 148. When RAM 34 is fully scanned, Accumulator 152 contains data peaked at text line datum locations as in FIG. 12. Extraneous peaks are removed in the logic of FIG. 17.

DATUM HISTOGRAM ANALYSIS

Figure 17:
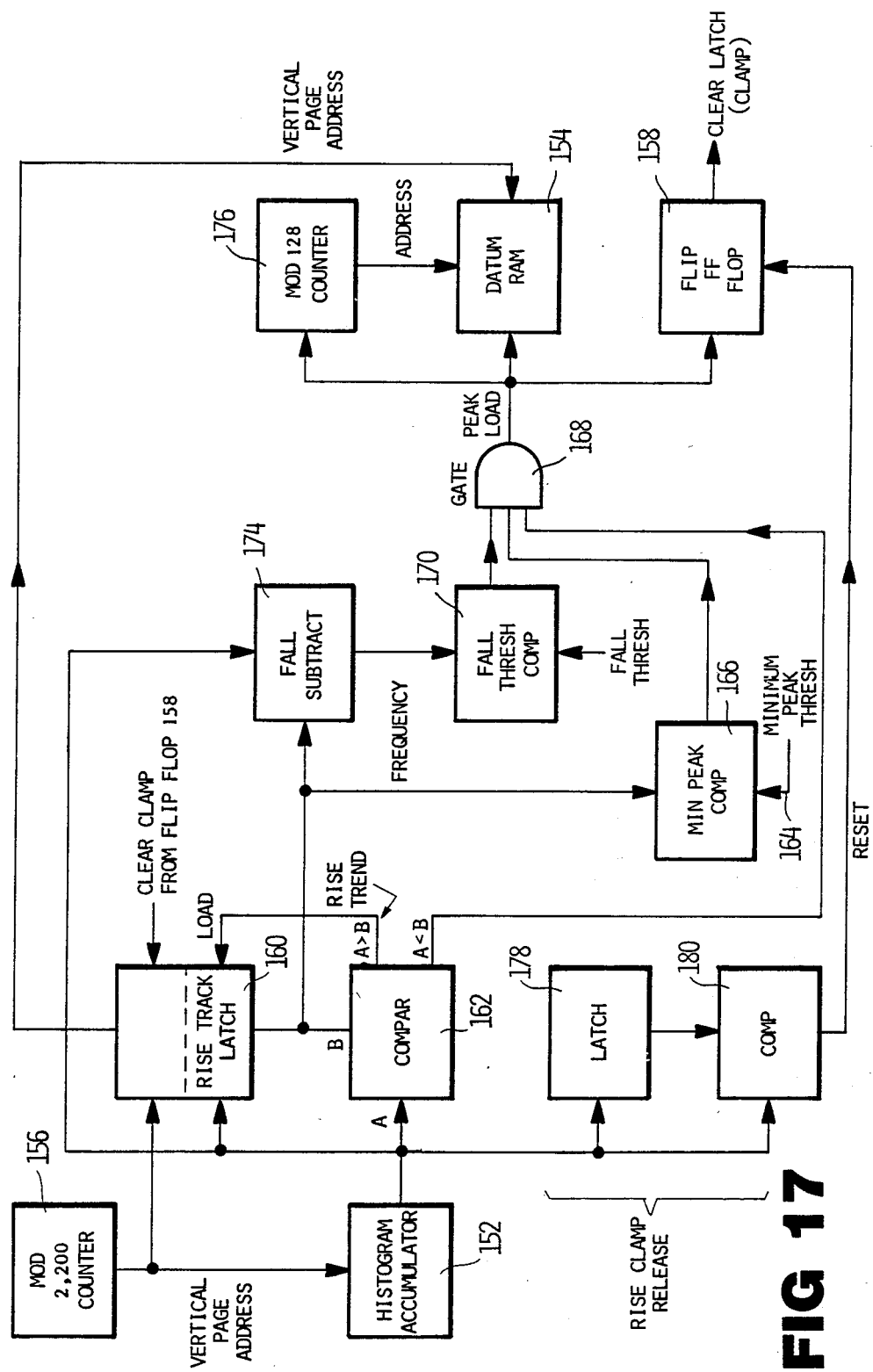
FIG. 17 is a diagram illustrating a logic and method by which the datums of the lines of text are calculated.

FIG. 17 demonstrates a logic and method by which the datums of the lines of text are calculated. The input to the logic is from the Histogram Accumulator 152, which was loaded in FIG. 16, and the output is to Datum RAM 154, which contains the vertical addresses of the datums. Modulo 128 counter 156 indicates the number of useable addresses stored in the Datum RAM 154.

It is assumed that the histogram data in Histogram Accumulator 152 are characterized by single address peaks, i.e. there are no plateaus, as in FIG. 12. FIG. 17 can be extended to accommodate plateau data, where the datum addresses are defined as the centers of those plateaus.

When Accumulator 152 is initially addressed, Flip Flop 158 is cleared to remove the clamp on Rise Track Latch 160, which initially holds null data. Additionally, Modulo 2,200 Counter 156 is reset to address the first term in Accumulator 152. Conter 156 then runs uninterrupted through its entire range before stopping at its maximum count of 2,199.

Latch 160 stores two items of data; the vertical page address, derived from Counter 156, and the hit frequency, as extracted from Accumulator 152. Latch 160 is designed to load when a new input hit frequency exceeds that stored in itself as effected by Comparator 162. When Inut "A" exceeds Input "B", Comparator 162 output "A>B" goes high to load Latch 160, but no action takes place when A=B.

As Counter 156 continues to increment, the data number pair, stored in Latch 160, progressively increases until Input "B" is greater than Input "A". Output "A>B" then goes low and output "A<B" goes high for comparator 152, indicating a falling condition on the histogram local peak. Latch 160 then contains the frequency and address of the peak; however, two criteria must be satisfied before the peak is loaded into Datum RAM 154. First, the frequency of the peak must exceed a minimum peak threshold provided as the reference at input 164 to Min Peak Comparator 166. As a positive indication, the output of Comparator 166 goes high to enable Gate 168, which is also activated by the "A<B" output of Comparator 162 going high.

Second, Fall Threshold Comparator 170 requires that the magnitude of the fall exceed the fall threshold reference input at 172. When the output of Comparator 170 goes high, Gate 168 is fully enabled. This technique obviates any small local anomalies from causing the prior high points from registering as histogram peaks.

The amount of the fall is developed by Subtractor 174, which provides the difference between the stored Hit Frequency in Latch 160, and the present value from Accumulator 152. The configuration of the logic of FIG. 17 allows several steps of Counter 156 to establish an acceptable fall.

An output from Gate 168 (indicating Peak Load) instructs Datum RAM 154 to record the address of the peak and to increment its own address Modulo 128 Counter 126. Flip Flop 158 is also set to clamp both halves of Latch 160 to null data. The clamp is released on the next rising trend by Latch 178 and Comparator 180 which allows Latch 160 to track the new rise. The output of Comparator 180 goes high to enable the reset when the present hit frequency from Accumulator 152 exceeds the prior frequency input stored in Latch 160. Once reset is effected, Latch 160 loads the present hit frequency.

Another possible refinement, not shown, is to provide a limit on how close datum addresses can be before loading into RAM 154 is permitted. If the difference between two consecutive addresses is below a threshold, only the address with the higher hit frequency is loaded into RAM 154. This easily implemented feature has proven to be effective in identifying lines of text encroached upon by non-textual material.

TEXT LINE TOP ANALYSIS

Figure 18:
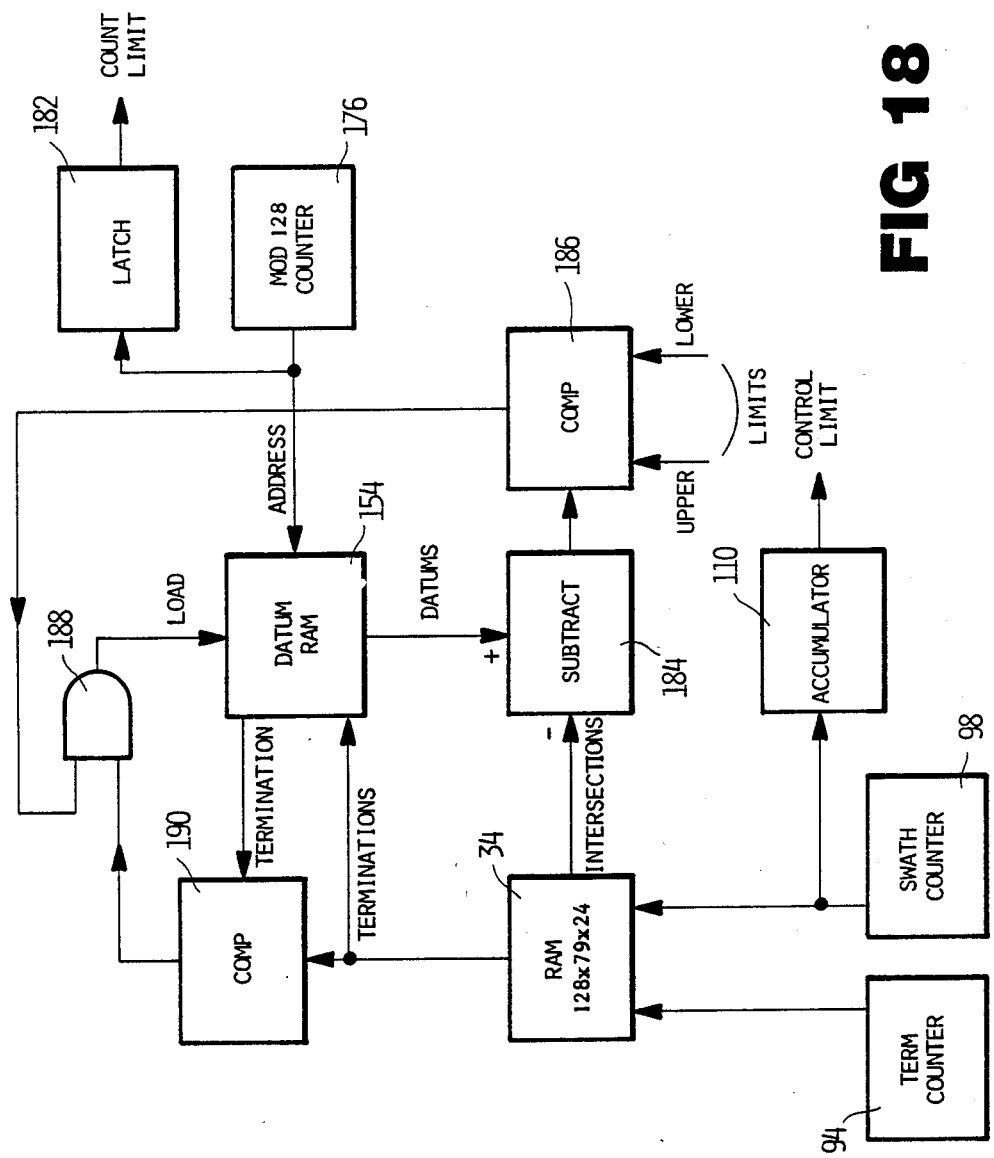
FIG. 18 is a block diagram illustrating logic by which the datum information contained in the datum RAM of FIG. 17 can be further processed to obtain text line top information.

The datum information, contained in Datum RAM 154 of FIG. 17, is further processed in FIG. 18 to obtain text line top information by also utilizing RAM 34, Term Counter 94, Swath Counter 98 and Accumulator 110—all of FIG. 14.

In FIG. 18, Modulo 128 Counter 176 addresses RAM 154 to sequentially recall the datum vertical positions. The initial value, contained in Counter 176, is held in Latch 182 to limit the range of Counter 176. The first datum position is presented as the subtrahend to Subtractor 184, which also receives as its addend the intersection information from RAM 154. Thus RAM 34 is scanned through all of its data address pairs by Term Counter 94 and Swath Counter 98. As previously described, the range of Term Counter 94 is limited by the data contained in Accumulator 110.

The output of Subtractor 184 is compared against pre-established upper and lower limits in Comparator 186. Comparator 186 develops an enabling output to Gate 188 when the output of Subtractor 184 is within those limits. Heretofore, RAM 154 appeared to store only text line datums; but, in fact, a second section thereof is reserved to store text line tops. This second section is independently cleared prior to entering the Line Top Analysis procedure logic.

For each intersection presented to Subtractor 184, its corresponding termination is input to Comparator 190 from RAM 34. The presently stored termination in RAM 154 is the input to Comparator 190. When the input from RAM 34 exceeds the input from RAM 154, Gate 188 is fully enabled, providing the output from Comparator 190 is high. Datum RAM 154 accepts the new termination data, but leaves the datum information intact in the above-described second, independent section of RAM 154. Thus, when RAM 34 is fully scanned, it contains the highest point on the text line specified by Counter 176. The foregoing process continues until all datum lines have been addressed. Each text line then has a datum and a top specified.

TEXT LINE BOTTOM ANALYSIS

The finding of text line bottoms is very similar to the determination of their tops, and the logic thereof is portrayed in FIG. 19. A third section in RAM 154 is set aside for storing line bottoms, and is loaded independently of the datum and line top information.

For each text line addressed by Counter 176, the stored datum and line top data are processed by Arithmetics 192 to produce the lowest allowable limit for a text line bottom. In essence, Arithmetics 192 subtracts a percentage of the difference between the line top and the datum from the datum. Comparator 194 enables Gate 188 when an intersection from RAM 34 falls between the computed low limit and the datum for the selected text line.

The line bottom section is initially preset to a value of 2,200 in RAM 154, which accepts subsequent intersection data, providing it is less than its stored data, and that the output of Comparator 194 is high. When Counter 176 has progressed through its full range, as restricted by the contents of Latch 182, RAM 154 contains the datums, tops, and bottoms of all text lines.

TEXT LINE LEFT AND RIGHT BOUNDARY ANALYSIS

The logic circuit of FIG. 20 is employed to establish the left and right boundaries of each line of text. Left boundaries are stored in a fourth section of Datum RAM 154, while right boundaries are held in a fifth section thereof. Both additional sections are individually loaded as are the first three sections herein before described.

As before, a text line is selected by Counter 176 to recall its top and bottom address values from RAM 154. The text line datum value is not required for this procedure.

Top Comparator 198 compares termination data from RAM 34 against the line top data from RAM 154. Comparator 198 enables Gate 200 when the input from RAM 34 is less than or equal to that from RAM 154. Similarly, Bottom Comparator 202 compares intersection data from RAM 34 against the bottom line data from RAM 154. Comparator 202 enables Gate 200 when the input from RAM 34 is less than or equal to that from RAM 154.

With both inputs to Gate 200 high, RAM 154 is instructed to load the swath number to which a numeral one has either been added or subtracted at 204 as explained below.

To find the left boundaries, Counter 98 is preset to the first swath and the Term Counter 94 is runcontinuously to thereby present data address pairs to Comparator 198 and 202. If no acceptable pair is disclosed in swath #1, Counter 98 is incremented to swath #2 and the procedure repeats, etc. If an acceptable pair is found, a numeral one is subtracted from the swath number in block 204, providing the new swath number is greater than zero. The left text line boundary is defined and Counter 98 is then preset to a value of 79 to seek the right boundary.

Scanning then proceeds as before, but Counter 98 is decremented until an acceptable data address pair is disclosed. A numeral one is added to the swath number in block 204, providing the new swath number does not exceed 79. Counter 176 then selects the next text line, and all procedures are duplicated.

ROTATIONAL CO-ORDINATE TRANSFORMATION

Once the Datum RAM 154 contains the X and Y co-ordinates of the four points bounding each line of text, it is necessary to rotate those points back into the co-ordinate system of the original page of text. This task is accomplished in the logic of FIG. 21, and completes the line finding process the present invention.

For a particular line of text, as selected by Counter 176, RAM 154 recalls the text line top position, the bottom position, and the left and right bounding swath numbers. Only one swath number output is shown in FIG. 21 as designated by the left or right swath boundary select line to RAM 154. A value of 40 of offset is subtracted from the swath number in Subtractor 206 and the difference is multiplied by the page tilt from FIG. 15 in Multiplier 208. The product is subtracted from the Line Top and Line Bottom positions, respectively, in Subtractors 210 and 212 to effect the necessary rotation correction.

The adjusted numbers are loaded into the Co-ordinate RAM 214 along with the swath number. The second boundary swath number is obtained by changing the state of RAM 154 select line to similarly load the remaining two text line bounding points into RAM 214. If required, the datum end points can also be corrected for storage.

GENERALIZED LOGIC DESCRIPTION

Turning now to FIGS. 22 through 25, the generalized flow chart logic for accomplishing the present invention is shown.

Figure 22:
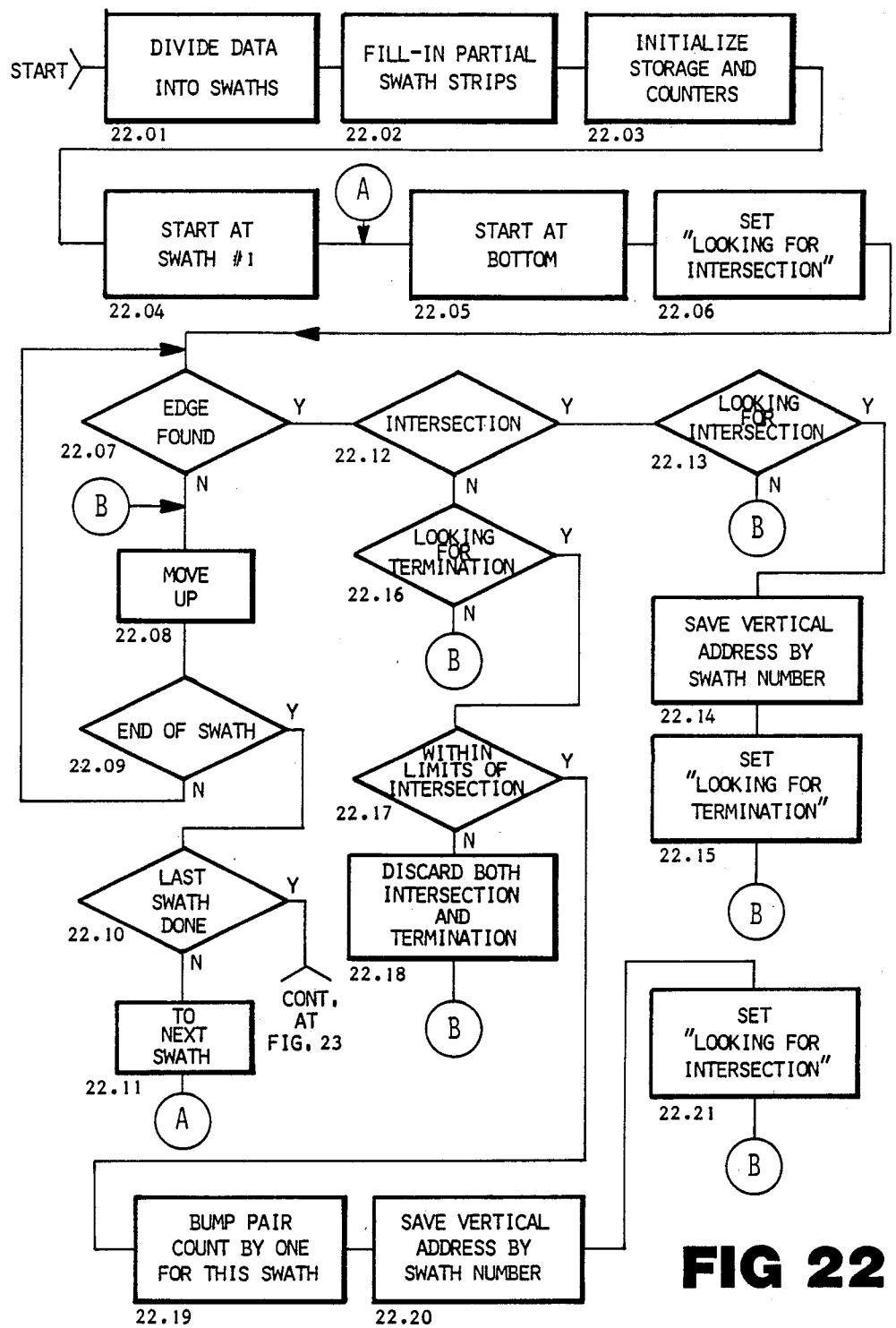
FIGS. 22-25 are logic flow charts of the logic incorporated into the system of FIG. 4 to implement the methodology of the present invention.

The logic starts at action block 22.01 in FIG. 22 by dividing the data into swaths. At action block 22.02, the logic then fills in partial swath strips in the manner as shown and described with respect to FIGS. 6 and 7. At action block 22.03, the logic then initializes the storage and counters to be employed thereafter. At action block 22.04, the logic starts with swath number 1, and at action block 22.05, it starts at the bottom of the particular swath it is processing. At action block 22.06, the logic next sets the condition of "looking for intersection". The logic then moves to question block 22.07 where it checks to see if an edge has been found. If it has not, the logic moves up the data at action block 22.08 and then at question block 22.09 checks to see if it has reached the end of the swath being processed. If not, it returns to question block 22.07 to see if an edge has been found yet. If the end of the swath has been reached at question block 22.09, the logic proceeds to question block 22.10 where it checks to see if the swath just completed was the last swath. If it was, it continues the processing by going to the logic of FIG. 24, to be discussed hereinafter. If that was not the last swath, at action block 22.11 the logic increments to the next swath and then returns to action block 22.05 to start at the bottom of that swath for processing.

If an edge was found at question block 22.07, the logic then proceeds to question block 22.12 where it checks to see if that edge was an intersection as defined in the particular implementation. If it was an intersection, at question block 22.13 the logic checks to see if it is in a state of "looking for intersection", as is set in action block 22.06. If the logic is presently looking for an intersection and one has been found, it moves to action block 22.14 where it saves the vertical address by swath number of the intersection which was found. The logic next sets the "looking for termination" condition at action block 22.15. It will be seen that this logic produces intersection/termination pairs as desired. The logic then returns to action block 22.08 to continue processing the particular swath.

If the edge found and tested at question block 22.12 was not an intersection, then, by definition, it is a termination. At question block 22.16, therefore, the logic next checks to see if it is in a state of "looking for termination" as set in block 22.15, i.e., it is looking for the second half of a pair. If it is, at question block 22.17 the logic checks to see if the termination found is within the pre-established limits of the intersection to which it is a pair. It should be remembered that terminations too close to or too far from their associated intersection by pre-established limits are not acceptable. If the termination is not within the pre-established limits, at action block 22.18 both the intersection and termination are discarded from the data and the logic returns to action block 22.08 to continue processing the swath. Likewise, if at question blocks 22.16 a termination was found and the logic was not in the "looking for termination" state, it is an extraneous termination and the logic returns immediately to block 22.08 to continue processing the swath without taking further action with respect to the extraneous termination.

If a valid termination has been found at question block 22.17, the logic moves to action block 22.19 where the pair counter for that particular swath is incremented by one. Next, at action block 22.20, the vertical address by swath number of the termination is stored in association with its intersection. At action block 22.21, the logic then sets the "looking for intersection" status once again, in order to begin looking for the next intersection/termination pair, and then returns to swath 22.08 to continue processing that swath.

Figure 23:
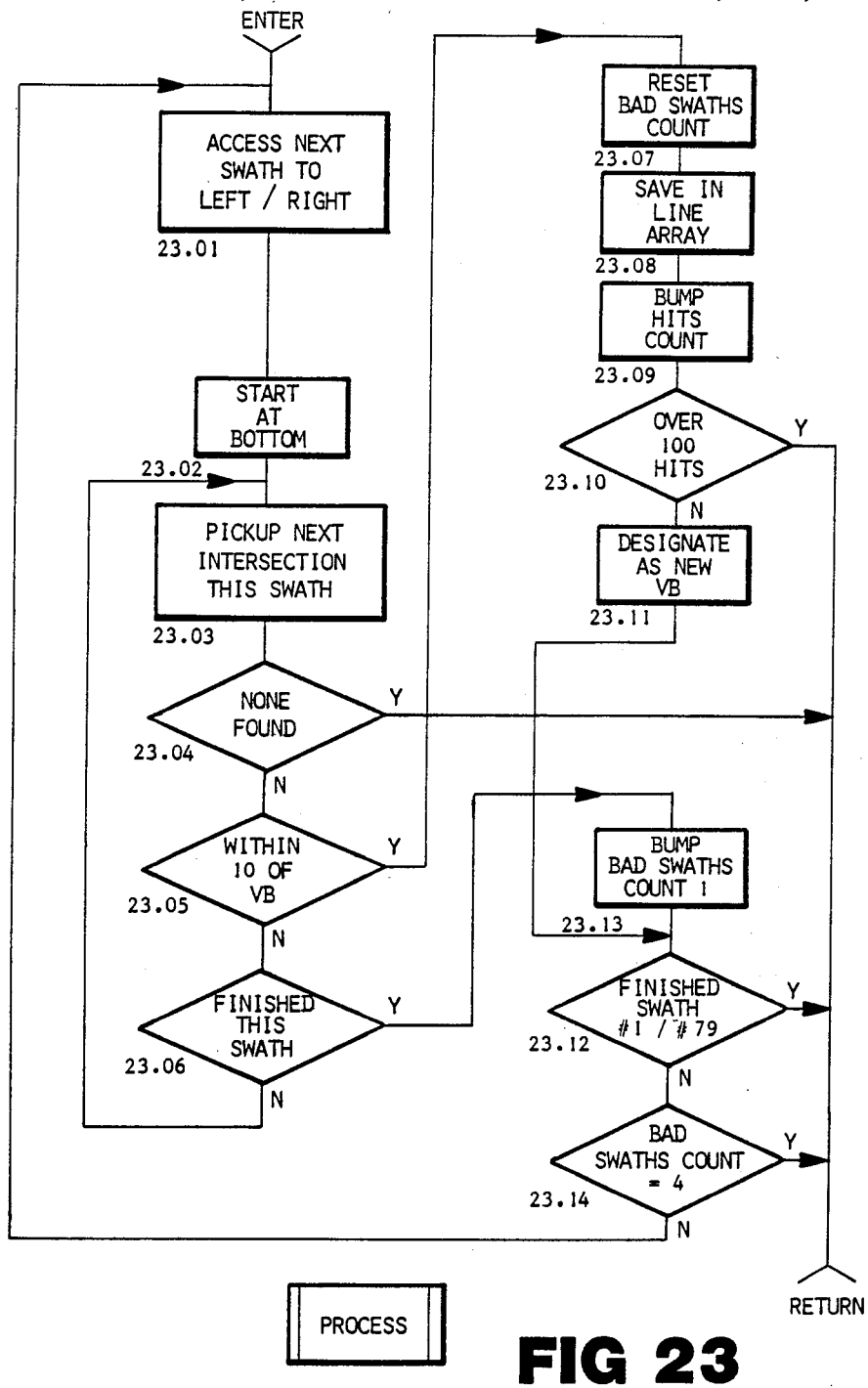

Before continuing with the logic flow in FIG. 24, the PROCESS subroutine as employed therein will first be discussed with reference to FIG. 23. It will be recalled that once the data has been established, a search left from "VB" and then a similar search right from "VB" is accomplished to make the points used by the regression analysis to find the skew angle. Subroutine PROCESS accomplishes the left and the right searches. Beginning at logic action block 23.01, the logic first accesses the next swath to the left or right depending on whether it is in the left or right search mode. At action block 23.02, it begins at the bottom of the swath. At action block 23.03, it attempts to pick up the next intersection in that swath. At action block 23.04, it checks to see if an intersection was found. If no intersection is found, the logic returns from the subroutine. At question block 23.05, the logic next checks to see if the intersection found was within ten of "VB" which, as will be recalled, was the criteria being employed. If a different criteria is used, the test of question block 23.05 of course, be modified accordingly. If the intersection found was not within the criteria tested for in question block 23.04 the logic next moves to question block 23.06 where it checks to see if it is finished with this swath. If not, the logic returns to action block 23.03 to look for another intersection within the particular swath being processed.

If an intersection point within the criteria of question block 23.05 is found, the logic moves to action block 23.07 where it resets the bad swaths count. At action block 23.08, the logic next saves the data in the line array and then at action block 23.09, it bumps the hits count by one. At question block 23.10, the logic next checks to see if there have been over one hundred hits. If there have, processing is complete and the logic returns from the subroutine. If not, at action block 23.11 the logic designates the intersection just found as the new "VB" and then proceeds to question blocks 23.12 to see if it has finished swath number one (if searching left) or swath number 79 (if searching right).

If it is found that question block 23.06 that a swath has been finished, the logic moves to action block 23.13 where the bad swath's count is incremented by one. It should be noted that block 23.13 is arrived at only if no valid intersection is found within a particular swath. The swath, by definition, is then "bad". The logic then moves to question block 23.12 which was previously described. If therein the logic finds that it has, in fact, finished the last swath to the left or right, as being searched, it returns from the subroutine. If the last swath in the direction being scanned has not been finished, the logic then moves to question block 23.14 where it checks to see if four swaths in a row have been bad. If not, the logic returns to action block 23.01 to process the next swath. If four consecutive bad swaths have been encountered, the logic returns from the subroutine.

Figure 24:
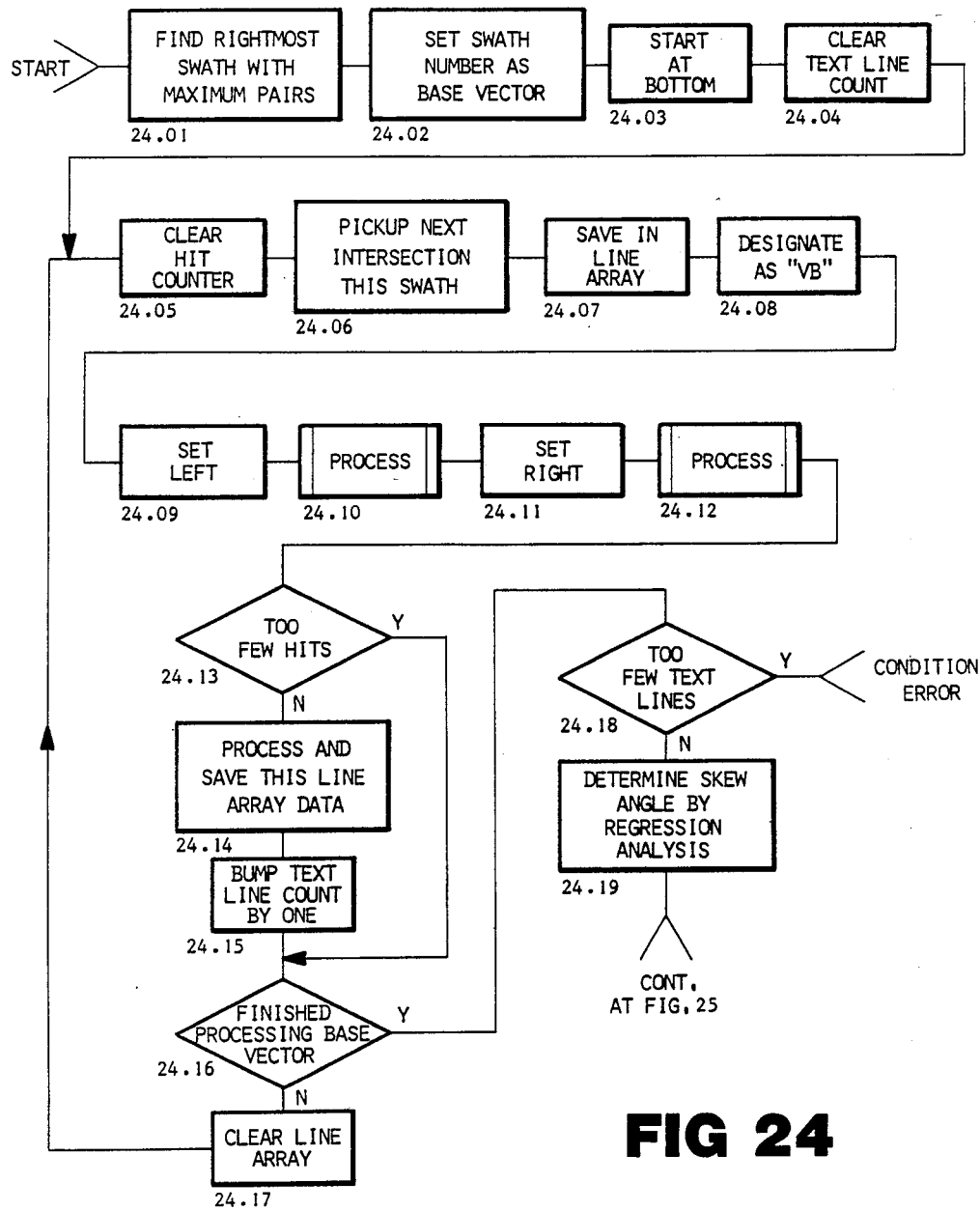

Turning now to FIG. 24, the logic continuation branched to from the logic of FIG. 22 when the last swath is found in question block 22.10 is shown. The logic begins with action block 24.01 wherein the right most swath with the maximum number of pairs is found. At action block 24.02, that swath number is set as the base vector. At action block 24.03, the logic begins at the bottom of the base vector swath. At action block 24.04, the logic next clears the text line counter. At action block 24.05, the logic next clears the hits counter. At action block 24.06, the logic next picks up the next available intersection from the bottom within the base vector swath. That intersection address is saved in the line array at action block 24.07. The intersection is next designated and saved as the present "VB" in action block 24.08. At action block 24.09, the logic sets the left search condition and branches to the PROCESS subroutine at block 24.10. Upon return from the PROCESS subroutine, the logic sets the right search condition at action block 24.11 and returns to the PROCESS subroutine once again at block 24.12. Upon returning from the PROCESS subroutine the second time, the line array contains data points from an apparent text line. At question block 24.13, the logic checks to see if there were too few hits according to the pre-established criteria as discussed indetail herein before. If not, the line array data is processed and saved at action block 24.14; for later use. The text line count is next increased by one at action block 24.15, following which the logic move to question block 24.16. If too few hits were found in the data at question block 24.13, the logic moves immediately to question block 24.16 thus bypassing the data in the line array. At question block 24.16, the logic checks to see if it is finished processing the base vector. If not, the line array is cleared at action block 24.17 after which the logic returns to action block 24.05 to process the next apparent text line. When the base vector has been completed, the logic moves to question block 24.18 where it checks to see if too few apparent text lines were counted. If there were too few text lines, an error condition exists which can be handled in any conventional manner. If not, the logic finds the text skew angle at action block 24.19, by performing a regression analysis on the data saved action block 24.14, and then continues processing at FIG. 25.

Figure 25:
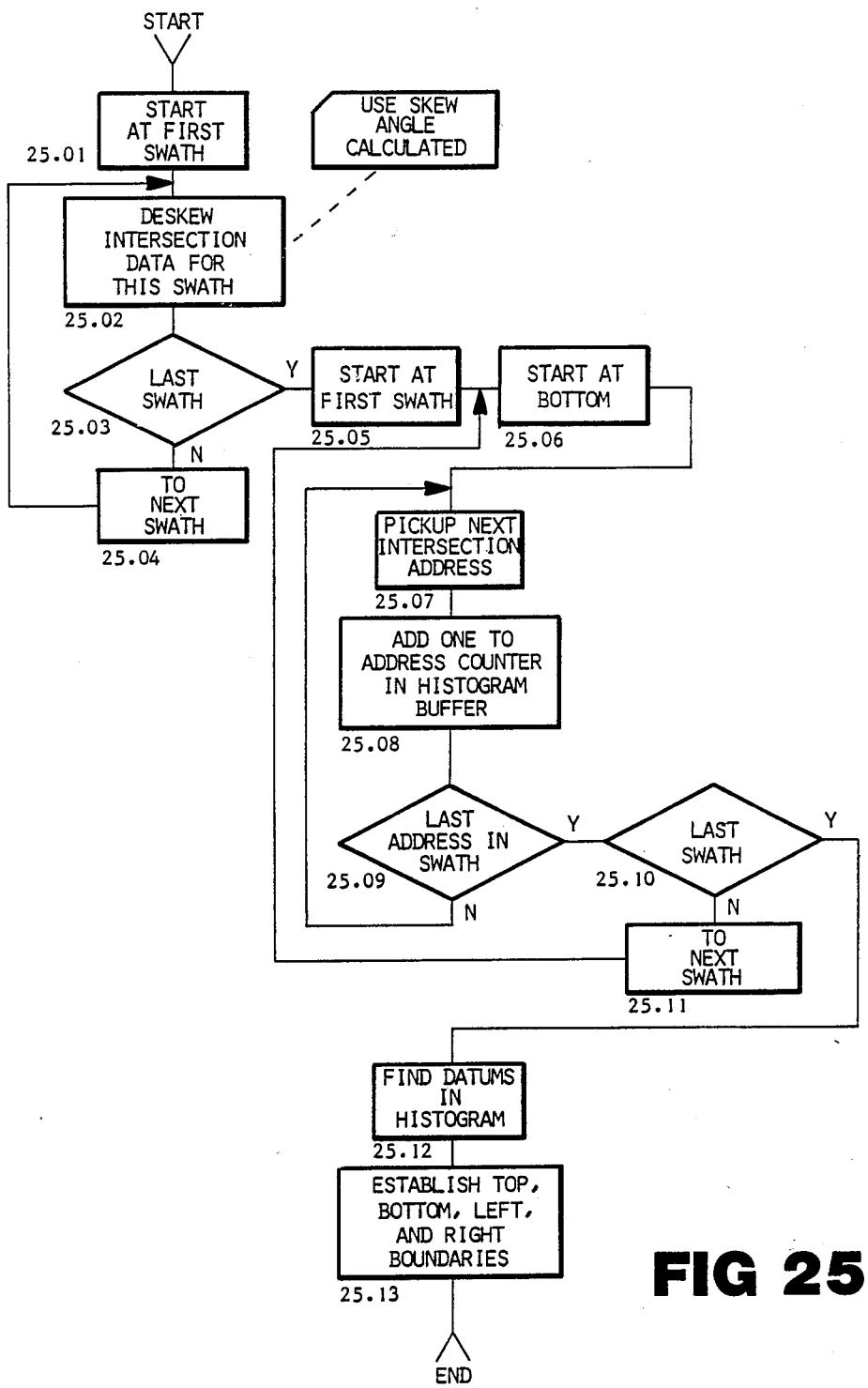

In the logic of FIG. 22, the data was pre-processed and then the intersection/termination pair data was gathered. In the logic of FIGS. 23 and 24, the data was processed and the skew angle of the text determined. Turning now to FIG. 25, the logic continues therein to find the boundaries of the text lines. At action block 25.01, the logic begins by starting at the first swath. At action block 25.02, the logic de-skews the intersectlon data for that swath, using the skew angle calculated previously as, for example, by employing equation III which was discussed herein earlier. At question block 25.03, the logic checks to see if it has de-skewed the last swath. If not, at action block 25.04 it moves to the next swath and then returns to action block 25.02 to de-skew that swath.

When the last swath has been de-skewed, at action block 25.05 the logic once again starts at the first swath and then at action block 25.06 it starts at the bottom of the swath. If next moves to action block 25.07 where it picks up the next intersection address. At action block 25.08, the logic adds one to the address counter in the histogram buffer for that intersection address. At question block 25.09, the logic checks to see if that was the last address in the swath. If not, the logic returns to action block 25.07 to pick up another intersection address for adding into the histogram buffer. If the last address has been found, at question block 25.10, the logic checks to see if that was the last swath. If not, it increments to the next swath at action block 25.11 following which it returns to action block 25.06 to begin at the bottom of the swath. When the last swath has been found at question block 25.10, the logic moves to action block 25.12 wherein the histogram counters are searched to establish the datums as described hereinbefore with respect to FIG. 10. Once the datums have been established from the histogram counters, at action block 25.13 the logic establishes the top, bottom, left and right boundaries of each text line in the manner such as hereinbefore described, following which, processing of the data can be accomplished in any of several manners well known in the art such that the logic of the present invention can terminate with the completion of action block 25.13 of FIG. 25.

Examples of prior art approaches to the problems of pattern normalization and recognition and digital, facsimile communication are disclosed in the following U.S. Pat. Nos. 3,760,357, 3,849,760, 3,868,167 and 4,091,424 as well as the article, "Combined Symbol Matching Facsimile Data Compression System", by William K. Pratt, et al., Proceedings of the IEEE, Vol. 68, No. 7, July 1980. However, for the reasons given above, Applicant's system contains many features not found in said prior art.

Wherefore, having thus described my invention, I claim:

1. In an optical scanning system having an optical scanning head for sequentially scanning horizontally across a document to create pixel oriented data representing text of the document for subsequent comparison searching to determine the alpha-numeric contents of the document, the improvement for automatically compensating for text line skew comprising:
   (a) means for dividing the data into equal swaths representing vertical columns on the documents;
   (b) means for scanning the data by swath to determine the apparent text line initiations and termination contained therein and for creating a data matrix of initiation/termination pairs by swath; said data matrix having at least left and right boundaries;
   (c) means for sequentially searching the data in the data matrix left and right for each pair in a base vector swath, representative of a predetermined range of apparent text line initiations and terminations, to trace the data indicative of apparent text lines to determine a plurality of points apparently on base lines of respective ones of the apparent text lines of the document;
   (d) means for determining the apparent skew angle of the text from the points on the apparent base lines; and;
   (e) means for bounding the data of the apparent text lines for subsequent comparison searching from the found intersection/termination pairs and apparent skew angle determined.

2. The improvement to an optical scanning system of claim 1 wherein said means for sequentially searching the data in the data matrix includes means for addressing vertical rows within each swath and additionally:
   means for temporarily connecting the data by swath during intersection/termination determination such that each vertical addressable row in each swath is treated as having all black pixels if any one pixel therein is, in fact, black.

3. The improvement to an optical scanning system of claim 1 wherein:
   said scanning means includes means for checking the separation between apparent initiations and terminations and for rejecting apparent pairs which do not meet pre-established separation criteria.

4. The improvement to an optical scanning system of claim 3 wherein:
   said scanning and rejecting means is adapted to reject an apparent initiation following an apparent termination unless at least two black pixels in sequence follow at least two white pixels in sequence in the swath being scanned.

5. In an optical scanning system having an optical scanning head for sequentially scanning horizontally across a document to create pixel oriented data representing the text of the document which is subsequently comparison searched to determine the alpha-numeric contents of the document, the method for automatically compensating for text line skew comprising:
   (a) dividing the data into equal swaths representing vertical columns on the document said swaths also containing vertically addressable rows;
   (b) scanning the data by swath to determine the apparent text line initiations and terminations contained therein and creating a data matrix of initiation/termination pairs by swath; said data matrix having at least left and right boundaries;
   (c) sequentially searching the data in the matrix left and right for each pair in a base vector swath, representative of a predetermined range of apparent text line initiations and terminations, to trace the data indicative of apparent text lines to determine a plurality of points apparently on base lines of respective ones of the apparent text lines of the document;
   (d) determining the apparent skew angle of the text from the points on the apparent base lines;
   (e) bounding the data of the apparent text lines from the found intersection/termination pairs and apparent skew angle determined; and
   (f) using the bounded apparent text line data for the comparison searching.

6. The method of claim 5 and additionally:
   temporarily connecting the data by swath during step (b) of intersection/termination determination such that each vertical addressable row in each swath is treated as having all black pixels if any one pixel therein is, in fact, black.

7. An optical scanning system capable of automatically compensating for document text line skewing comprising:
   (a) scanning head means for sequentially scanning across the document to develop a data matrix of pixel oriented digital data bits;
   (b) logic means for searching said data bits by document column related swaths to determine a plurality of points apparently lying on the document text lines, for determining said text lines' apparent skew angle from said points, and for determining the left, right, top, and bottom boundaries in said data matrix for respective ones of said text lines from said points and said skew angle, said swaths also containing vertically addressable rows and (c) means for picking up the data from said data matrix within said boundaries for use in comparing said data bits to known bit configurations and determining the alpha-numeric contents of the document text;

said logic means including means for setting all said pixel oriented digital data bits for each addressable vertical row within each swath to indicate black if any one of said bits initially indicates black.

8. The optical scanning system of claim 7 wherein:
said logic means includes means for determining apparent pairs of initiations and terminations of text lines within said swaths, for checking the separation between said apparent initiations and terminations, and for rejecting apparent pairs which do not meet pre-established separation criteria.

9. The optical scanning system of claim 8 wherein:
said logic means is adapted to reject an apparent initiation following an apparent termination unless at least two black pixels in sequence follow at least two white pixels in sequence in the swath being scanned.

10. An optical scanning system capable of automatically compensating for document text line skewing comprising:

scanning head means for sequentially scanning across the document to develop a data matrix of pixel oriented digital data bits;

logic means for searching said data bits by document column related swaths to determine a plurality of points apparently lying on the document text lines, for determining said text lines' apparent skew angle from said points, and for determining the left, right, top, and bottom boundaries in said data matrix for respective ones of said text lines from said points and said skew angle, said swaths also containing vertically addressable rows; and means for picking up the data from said data matrix within said boundaries for use in comparing said data bits to known bit configurations and determining the alpha-numeric contents of the document text;

said logic means including storage means and counter means and further including logic to accomplish the steps of:

(a) dividing the data into swaths;
(b) filling in partial swath strips such that all pixels for each addressable vertical row within each swath are treated as black if any one of the bits is initially black;
(c) initializing the storage means and counter means;
(d) starting at swath #1;
(e) starting at the bottom of the swath;
(f) setting the condition "looking for intersection";
(g) checking to see if an edge has been found and if it has, going to step (l);
(h) moving up the data in the swath;
(i) checking to see if the end of the swath has been reached and if it has not, going back to step (g);
(j) checking to see if the last swath has been done and if it has, terminating this portion of the logic;
(k) proceeding to the next swath and returning to step (e);
(l) checking to see if the edge is an intersection and if not, going to step (p);
(m) checking to see if the "looking for intersection" condition is set and if not, going back to step (h);
(n) saving the vertical address of the intersection by swath number;
(o) setting the "looking for termination" condition and going back to step (h);
(p) checking to see if the "looking for termination" condition is set and if not returning to step (h);
(q) checking to see if the termination edge found is within the allowed distance limitations of the matching intersection and if it is, proceeding to step (s);
(r) discarding both the intersection and termination addresses and proceeding back to step (h);
(s) bumping the pair count by one for this swath;
(t) saving the vertical address of the termination by swath number; and,
(u) setting the "looking for intersection" condition and proceeding back to step (h).

11. The optical scanning system of claim 10 wherein such logic means includes a text line counter and a hits counter and additionally includes logic following step (j) thereof when the last swath is done to accomplish the additional steps of:

(a) finding the rightmost swath with the maximum number of pairs;
(b) setting that swath as the base vector;
(c) starting at the bottom of the base vector swath;
(d) clearing the text line counter;
(e) clearing the hits counter;
(f) picking up the next intersection in the swath;
(g) saving it in a line array;
(h) designating it as "VB";
(i) setting a left search condition;
(j) going to step (aa);
(k) setting a right search condition;
(l) going to step (aa);
(m) checking to see if there were too few hits and if there were, proceeding the step (p);
(n) processing and saving the data presently in the line array;
(o) bumping the text line count by one;
(p) checking to see if the processing of the base vector is finished and going to step (r) if it is;
(q) clearing the line array and going back to step (e);
(r) checking to see if there were too few text lines determined to be in the document and terminating the logic in an error state if there were;
(s) determining the skew angle of the text by a linear regression analysis of the data and terminating this portion of the logic;
(aa) accessing the text swath to the left or right as requested;
(ab) starting at the bottom of the swath;
(ac) picking up the next intersection in the swath;
(ad) checking to see if no intersection was found and if none was found, going to step (ao);
(ae) checking to see if the intersection found was within ten vertical lines of VB and if it was, going to step (ag);

(af) checking to see if processing of this swath is finished and going to step (al) if it is and back to step (ac) if it is not;
(ag) resetting the bad swath's count;
(ah) saving the intersection in the line array;
(ai) bumping the hits count;
(aj) checking to see if there are presently over 100 hits and going to step (ao) if there are;
(ak) designating this intersection as the new VB and going to step (am);
(al) bumping the bad swaths count by one;
(am) checking to see if swath #1 or swath #79 has been finished and going to step (ao) if it has;
(an) checking to see if the bad swaths count is equal to 4 and going to step (aa) if it is not; and,
(ao) returning to step (k) if a left search was just accomplished and to step (m) if a right search was just accomplished.

12. The optical scanning system of claim 11 wherein said logic means includes a histogram buffer and additionally includes logic following step(s) thereof to accomplish the additional steps of:

(a) starting at the first swath;
(b) de-skewing the intersection data for this swath by using the skew angle calculated in the logic previously;
(c) checking to see if the last swath has been processed and if it has, going to step (e);
(d) going to the next swath and returning to step (b);
(e) starting at the first swath;
(f) starting at the bottom of the swath;
(g) picking up the next intersection address;
(h) adding one to this address's counter in the histogram buffer;
(i) checking to see if that was the last address in the swath and returning to step (g) if it was not;
(j) checking to see if the last swath has been processed and going to step (l) if it has;
(k) going to the next swath and returning to step (f);
(l) finding the datums in the histogram; and,
(m) establishing the top, bottom, left, and right boundaries for the apparent text lines with respect to the datums.

* * * * *